(12) United States Patent
Ramaswami et al.

(10) Patent No.: US 6,947,623 B2
(45) Date of Patent: Sep. 20, 2005

(54) SIGNALS AND METHODS FOR INCREASING RELIABILITY IN OPTICAL NETWORK EQUIPMENT

(75) Inventors: Rajiv Ramaswami, Sunnyvale, CA (US); Robert R. Ward, Sunnyvale, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/650,543

(22) Filed: Aug. 28, 2003

(65) Prior Publication Data

US 2004/0037553 A1 Feb. 26, 2004

Related U.S. Application Data

(62) Division of application No. 09/704,439, filed on Nov. 1, 2000, now Pat. No. 6,650,803.
(60) Provisional application No. 60/200,425, filed on Apr. 28, 2000, provisional application No. 60/186,108, filed on Mar. 1, 2000, provisional application No. 60/170,092, filed on Dec. 10, 1999, provisional application No. 60/170,093, filed on Dec. 10, 1999, provisional application No. 60/170,095, filed on Dec. 10, 1999, provisional application No. 60/170,094, filed on Dec. 10, 1999, and provisional application No. 60/162,936, filed on Nov. 2, 1999.

(51) Int. Cl.[7] .............................. G02B 6/26; G02F 1/00
(52) U.S. Cl. .............................. 385/16; 385/15; 385/17; 385/24; 385/42; 385/40; 398/2; 398/7; 398/4; 398/5; 398/50; 398/56
(58) Field of Search .............................. 385/15, 16, 17, 385/24, 14, 42, 40; 398/2, 7, 4, 5, 10, 12, 13, 20, 30, 50, 56, 57, 79

(56) References Cited

U.S. PATENT DOCUMENTS 3,651,392 A   3/1972 Frisch et al. ................ 318/561
4,365,863 A   12/1982 Broussaud ................ 385/18 X
4,369,523 A   1/1983 Seki et al. ................ 455/601
4,437,190 A   3/1984 Rozenwaig et al. ........ 455/600
4,470,154 A   9/1984 Yano ........................ 455/607

(Continued)

FOREIGN PATENT DOCUMENTS

| EP | 0 674 457 A2 | 9/1995 | ............... 385/24 X |
| EP | 0 721 275 A2 | 12/1995 | ............ H04M/3/36 |
| EP | 0 752 794 A2 | 1/1997 | ........... H04Q/11/00 |
| EP | 0 759 681 A2 | 2/1997 | ............... 385/17 X |
| EP | 0 809 384 A2 | 5/1997 | ........... H04L/29/14 |

(Continued)

OTHER PUBLICATIONS

A. Himeno, R. Nagase, T. Ito, K.Kato and M. Okuno; Photonic Inter–Module Connector Using 8×8 Optical Switches for Near–Future Electronic Switching Systems; IEICE Transactions on Communications; E77–B (1994) Feb., No. 2, Tokyo, JP.

(Continued)

*Primary Examiner*—Brian M. Healy
(74) *Attorney, Agent, or Firm*—Blakely Sokoloff Taylor & Zafman

(57) ABSTRACT

Methods, apparatus and systems for regenerating, monitoring and bridging optical signals through an optical cross-connect switch to provide increased reliability. A self testing method, apparatus and system for an optical cross-connect switch. An optical-to-electrical-to-optical converter (O/E/O) is provided in an optical cross-connect switch to provide optical-electrical-optical conversion. I/O port cards having an optical-to-electrical-to-optical converter are referred to as smart port cards while I/O port cards without an optical-to-electrical-to-optical converter are referred to as passive port cards. Test port/monitor cards are also provided for testing optical cross-connect switches. Methods, apparatus and systems for performing bridging, test access, and supporting redundant optical switch fabrics are also disclosed.

22 Claims, 24 Drawing Sheets

U.S. PATENT DOCUMENTS

| | | | | |
|---|---|---|---|---|
| 4,519,670 A | | 5/1985 | Spinner et al. ............ | 385/15 X |
| 4,530,566 A | | 7/1985 | Smith et al. ............... | 350/96.2 |
| 4,563,774 A | | 1/1986 | Gloge ........................ | 455/607 |
| 4,580,873 A | | 4/1986 | Levinson .................. | 385/17 X |
| 4,612,670 A | | 9/1986 | Henderson ................. | 455/607 |
| 4,634,239 A | | 1/1987 | Buhrer ....................... | 350/486 |
| 4,797,879 A | | 1/1989 | Habbab et al. ................ | 370/3 |
| 4,817,014 A | | 3/1989 | Schneider et al. ..... | 364/728.03 |
| 4,843,382 A | | 6/1989 | Oda et al. ............... | 455/601 X |
| 4,856,863 A | | 8/1989 | Sampsell et al. ......... | 385/18 X |
| 4,859,012 A | | 8/1989 | Chon ........................ | 385/18 X |
| 4,886,335 A | | 12/1989 | Yanagawa et al. ......... | 385/18 X |
| 4,897,830 A | | 1/1990 | Hill et al. ...................... | 370/4 |
| 4,903,225 A | | 2/1990 | Brost .......................... | 375/96 |
| 4,982,446 A | | 1/1991 | Lord et al. .................. | 455/606 |
| 4,984,238 A | | 1/1991 | Watanabe et al. ......... | 370/105.1 |
| 5,035,482 A | | 7/1991 | ten Berge et al. ......... | 350/96.2 |
| 5,037,173 A | | 8/1991 | Sampsell et al. ............. | 385/17 |
| 5,077,729 A | * | 12/1991 | Wong .......................... | 398/31 |
| 5,157,652 A | | 10/1992 | Walker ........................ | 370/17 |
| 5,216,729 A | | 6/1993 | Berger et al. ................. | 385/31 |
| 5,253,274 A | | 10/1993 | Janniello et al. ............ | 375/121 |
| 5,260,819 A | | 11/1993 | Hadifotiou et al. ........... | 359/10 |
| 5,272,556 A | | 12/1993 | Faulkner et al. ............. | 359/125 |
| 5,299,044 A | | 3/1994 | Mosch et al. ............... | 359/110 |
| 5,349,550 A | | 9/1994 | Gage ..................... | 364/728.03 |
| 5,355,238 A | | 10/1994 | Kight et al. ................. | 354/135 |
| 5,359,683 A | | 10/1994 | Pan .............................. | 385/22 |
| 5,440,654 A | | 8/1995 | Lambert, Jr. .................. | 385/17 |
| 5,477,364 A | | 12/1995 | Pearson ....................... | 385/17 |
| 5,485,300 A | | 1/1996 | Daley ......................... | 359/139 |
| 5,487,120 A | | 1/1996 | Choy et al. ................... | 385/24 |
| 5,488,862 A | | 2/1996 | Neukermans et al. .... | 73/501.02 |
| 5,515,361 A | | 5/1996 | Li et al. ....................... | 370/15 |
| 5,521,732 A | | 5/1996 | Nishio ........................ | 359/120 |
| 5,521,734 A | | 5/1996 | Frigo ......................... | 359/152 |
| 5,524,153 A | | 6/1996 | Laor ........................... | 385/16 |
| 5,535,293 A | | 7/1996 | Buchin ........................ | 385/27 |
| 5,539,328 A | | 7/1996 | Mirov et al. .................. | 326/30 |
| 5,570,371 A | | 10/1996 | Iga .............................. | 370/99 |
| 5,608,735 A | | 3/1997 | McCullough et al. ....... | 370/51.3 |
| 5,629,790 A | | 5/1997 | Neukermans et al. ....... | 359/198 |
| 5,629,919 A | | 5/1997 | Hayashi et al. ............. | 369/112 |
| 5,648,618 A | | 7/1997 | Neukermans et al. .... | 73/862.08 |
| 5,666,487 A | | 9/1997 | Goodman et al. ..... | 393/200.76 |
| 5,694,389 A | | 12/1997 | Seki et al. ................... | 375/326 |
| 5,699,463 A | | 12/1997 | Yang et al. ................... | 385/22 |
| 5,719,903 A | | 2/1998 | Hiben et al. ................. | 375/322 |
| 5,727,098 A | | 3/1998 | Jacobson ..................... | 385/31 |
| 5,729,527 A | | 3/1998 | Gerstel et al. .............. | 370/228 |
| 5,745,274 A | | 4/1998 | Fatehi et al. ................. | 359/187 |
| 5,774,604 A | | 6/1998 | McDonald .................. | 385/18 |
| 5,781,537 A | | 7/1998 | Ramaswami et al. ....... | 370/250 |
| 5,793,746 A | | 8/1998 | Gerstel et al. .............. | 370/228 |
| 5,801,863 A | | 9/1998 | Fatehi et al. ................. | 359/124 |
| 5,825,877 A | | 10/1998 | Dan et al. ...................... | 380/4 |
| 5,825,824 A | | 10/1998 | Choy et al. ................... | 385/24 |
| 5,828,476 A | | 10/1998 | Bonebright et al. ......... | 350/152 |
| 5,864,643 A | | 1/1999 | Pan .............................. | 385/33 |
| 5,867,289 A | * | 2/1999 | Gerstel et al. ................ | 398/12 |
| 5,892,606 A | | 4/1999 | Fatehi et al. ................. | 359/177 |
| 5,900,968 A | | 5/1999 | Srivastava et al. ........... | 359/341 |
| 5,903,687 A | | 5/1999 | Young et al. ................. | 385/17 |
| 5,915,063 A | | 6/1999 | Colbourne et al. ........... | 385/140 |
| 5,942,937 A | | 8/1999 | Bell ............................ | 329/303 |
| 5,960,132 A | | 9/1999 | Lin ............................ | 385/18 |
| 5,963,350 A | | 10/1999 | Hill .............................. | 385/27 |
| 5,970,201 A | | 10/1999 | Anthony et al. ............. | 385/140 |
| 5,978,113 A | | 11/1999 | Kight ......................... | 359/110 |
| 6,002,818 A | | 12/1999 | Fatehi et al. .................. | 385/17 |
| 6,005,694 A | * | 12/1999 | Liu ................................. | 398/6 |
| 6,005,993 A | | 12/1999 | MacDonald ................. | 385/16 |
| 6,008,915 A | | 12/1999 | Zyskind ...................... | 359/110 |
| 6,009,220 A | | 12/1999 | Chan et al. ................... | 385/24 |
| 6,046,833 A | | 4/2000 | Sharma et al. .............. | 359/119 |
| 6,047,331 A | | 4/2000 | Medard et al. .............. | 709/239 |
| 6,069,924 A | | 5/2000 | Sudo et al. .................. | 375/330 |
| 6,072,612 A | | 6/2000 | Liou et al. ................... | 359/123 |
| 6,081,361 A | | 6/2000 | Adams et al. .............. | 359/188 |
| 6,097,858 A | | 8/2000 | Laor ........................... | 385/16 |
| 6,097,859 A | | 8/2000 | Solgaard et al. .............. | 385/17 |
| 6,108,311 A | | 8/2000 | Ramaswami et al. ........ | 370/228 |
| 6,130,876 A | | 10/2000 | Chaudhuri .................. | 370/228 |
| 6,147,968 A | | 11/2000 | DeMoer et al. ............. | 370/225 |
| 6,148,124 A | | 11/2000 | Aksyuk et al. ............... | 385/24 |
| 6,160,821 A | | 12/2000 | Dolle et al. ................. | 370/509 |
| 6,188,810 B1 | | 2/2001 | Baney ......................... | 385/11 |
| 6,188,814 B1 | | 2/2001 | Bhalla ......................... | 385/15 |
| 6,192,172 B1 | | 2/2001 | Fatehi et al. ................ | 359/124 |
| 6,195,402 B1 | | 2/2001 | Hiramatsu ................... | 375/368 |
| 6,198,571 B1 | | 3/2001 | Yank .......................... | 375/368 |
| 6,207,949 B1 | | 3/2001 | Jackel ......................... | 250/227 |
| 6,222,954 B1 | | 4/2001 | Riza ............................ | 385/18 |
| 6,252,689 B1 | | 6/2001 | Sharp ......................... | 359/168 |
| 6,253,001 B1 | | 6/2001 | Hoen .......................... | 385/17 |
| 6,285,809 B1 | | 9/2001 | Nir et al. ..................... | 385/16 |
| 6,295,154 B1 | | 9/2001 | Laor et al. ................... | 359/223 |
| 6,301,402 B1 | | 10/2001 | Bhalla et al. ............... | 359/128 |
| 6,317,530 B1 | | 11/2001 | Ford .......................... | 385/17 |
| 6,374,008 B2 | | 4/2002 | Solgaard et al. ............ | 359/224 |
| 6,392,220 B1 | | 5/2002 | Slater et al. ................. | 250/216 |
| 6,400,730 B1 | | 6/2002 | Latif et al. ................. | 370/466 |
| 6,650,803 B1 | * | 11/2003 | Ramaswami et al. ......... | 385/17 |
| 6,714,740 B2 | * | 3/2004 | Tajima ........................ | 398/31 |
| 2003/0076846 A1 | * | 4/2003 | Heinz et al. ................ | 370/404 |

FOREIGN PATENT DOCUMENTS

| | | | | |
|---|---|---|---|---|
| EP | 0 857 000 A2 | 1/1998 | ......... | H04Q/11/00 |
| EP | 0 647 457 A3 | 5/1998 | .......... | H04Q/11/00 |
| EP | 0 849 906 A2 | 6/1998 | .......... | H04Q/11/00 |
| EP | 0 898 440 A2 | 2/1999 | .......... | H04Q/11/00 |
| EP | 0 910 138 A1 | 4/1999 | ........... | H01S/3/025 |
| EP | 0 932 069 A1 | 7/1999 | ............. | G02F/1/09 |
| EP | 0 938 244 A2 | 8/1999 | ............. | 385/24 X |
| EP | 0 953 854 A1 | 11/1999 | ............. | 385/18 X |
| EP | 0 994 635 A1 | 4/2000 | ............. | 385/18 X |
| EP | 0 857 000 A3 | 8/2000 | ............. | 385/18 X |
| EP | 1 087 556 A1 | 3/2001 | .......... | H04B/10/43 |
| GB | 2347570 A | 3/1999 | ........... | H04J/14/02 |
| WO | WO 86/04205 | 7/1986 | .......... | H04Q/11/02 |
| WO | WO 86/05649 | 9/1986 | .......... | H04Q/11/02 |
| WO | WO 90/14734 | 11/1990 | ........ | H04N/7/22 |
| WO | WO 91/01603 | 2/1991 | .......... | H04J/14/08 |
| WO | WO 95/19689 | 7/1995 | .......... | H04Q/11/00 |
| WO | WO 97/24822 | 7/1997 | .......... | H04B/10/08 |
| WO | WO 98/54863 | 5/1998 | .......... | H04J/14/02 |
| WO | WO 99/13656 | 3/1999 | .......... | H04J/14/02 |
| WO | WO 99/18751 | 4/1999 | .......... | H04Q/3/53 |
| WO | WO 99/40738 | 8/1999 | ............. | 385/24 X |
| WO | WO 00/13210 | 9/1999 | ............. | 385/18 X |
| WO | WO 99/48323 | 9/1999 | ............. | 385/18 X |
| WO | WO 99/59272 | 11/1999 | ............. | 385/18 X |
| WO | WO 99/63374 | 12/1999 | ............. | 385/18 X |
| WO | WO 99/63531 | 12/1999 | ............. | 385/18 X |
| WO | WO 99/66354 | 12/1999 | ............. | 385/18 X |
| WO | WO 99/67666 | 12/1999 | ............. | 385/18 X |
| WO | WO 00/04671 | 1/2000 | ............. | 385/18 X |
| WO | WO 00/13210 A2 | 3/2000 | ............. | 385/18 X |
| WO | WO 00/13210 A3 | 3/2000 | ............. | 385/18 X |
| WO | WO 00/20899 A3 | 4/2000 | ............. | 385/18 X |
| WO | WO 00/20899 | 4/2000 | ............. | 385/18 X |

| | | | | |
|---|---|---|---|---|
| WO | WO 00/20899 A2 | 4/2000 | ................ | 385/18 X |
| WO | WO 00/30282 | 5/2000 | ................ | 385/18 X |
| WO | WO 00/52865 | 9/2000 | ................ | 385/18 X |
| WO | WO 00/07945 | 2/2001 | ................ | 385/18 X |
| WO | WO 01/28136 A1 | 4/2001 | ............ | H04B/10/08 |
| WO | WO 01/50176 A1 | 7/2001 | ................ | 385/18 X |
| WO | WO 01/63803 A1 | 8/2001 | ................ | 385/18 X |
| WO | WO 01/71403 | 9/2001 | ................ | 385/18 X |

OTHER PUBLICATIONS

Lin. L. Y. et al.; Micro–Electro–Mechanical Systems (MEMS) for WDM Optical–Crossconnect Networks, Milcom 1999; IEEE Military Communications Conf Proceedings; Atlantic City, NJ Oct. 31–Nov. 3, 1999; pp. 954–957.

S. Okamoto, et al.; Optical Path Cross–Connect Node Architectures for Photonic Transport Network, Journal of Lightwave Technology, vol. 14, No. 6, Jun. 1996, pp. 1410–1422.

Gustaffson, K. & Hok, B., A Batch–Processed Optical Scanner Proc. 12th Nordic Semiconductor Meeting, Jevnaker (Oslo: Center for Industrial Research) pp. 282–285, 1996.

Gustaffson, K. & Hok, B., Fiberoptic Switching and Multiplexing with a Micromechanical Scanning Mirror, Digest of Technical Papers, 4th Int. Conf. On Solid State Sensors and Actuators (Tokyo: Institute of Electrical Engineers of Japan) pp. 212–215, 1985.

Gustaffson, K. & Hok, B., A Silicon Light Modulator, Journal of Physics E. Scientific Instruments 21, pp. 608, 1998.

Lin L. Y., et al., Free–Space Micormachined Optical–Switching Technologies and Architectures, OFC/100C '00, Feb. 21–26, 1999.

Laor, H., et al., Performance of a 576×576 Optical Cross Connect, NFOEC–99.

Types and Characteristics of SDH Network Protection Architectures; ITU–T Recommendation G.841 Oct. 1998.

Rajiv Ramaswami & Kumar Sivarajan, Optical Networks: A Practical Perspective, Morgan Kaufmann Pub. 1998, pp 152–161.

Rajiv Ramaswami & Kumar Sivarajan, Optical Networks: A Practical Perspective, Morgan Kaufmann Pub. 1998, pp 423–462.

Chad White, The Photonic Switch Completes the Much–Vaunted All–Optical Network, Technology Investor, Oct. 2000, pp 28–31.

Bischoff, et al., Operation and Maintenance for an All–Optical Transport Network, IEEE Communications, Magazine, pp 136–142, Nov. 1996.

Lin. et al., Free–Space Micromachined Optical Switches with Submillisecond Switching Time for Large–Scale Optical Crossconnects, pp 525–527, Apr. 1998.

Kaufman, et al., The Optical Internet, A New Network Architecture, pp 1–13.

Simon, et al., All Optical Regeneration, IEEE, pp 53–54.

Peter Wong & Mark Yin, An Economic Analysis for Core Optical Transport Networks.

Craig Labovitz, Abha Ahuja, Farnam Jahanaian, Experimental Study of Internet Stability and Backbone Failures, IEEE, pp 278–285, 1999.

* cited by examiner

SIGNALS AND METHODS FOR INCREASING RELIABILITY IN OPTICAL NETWORK EQUIPMENT

CROSS REFERENCE TO RELATED APPLICATIONS

"This non-provisional U.S. (U.S.) patent application claims the benefit of and is a divisional of U.S. patent application Ser. No. 09/704,439 filed on Nov. 1, 2000 by inventors Rajiv Ramaswami, et al., entitled "METHOD AND APPARATUS FOR OPTICAL TO ELECTRICAL TO OPTICAL CONVERSION IN AN OPTICAL CROSS-CONNECT SWITCH", now U.S. Pat. No. 6,650,803.

The parent patent application, U.S. patent application Ser. No. 09/704,439, claims the benefit of U.S. Provisional Patent Application No. 60/162,936 entitled "OPTICAL CROSSCONNECT WITH OPTICAL TO ELECTRICAL CONVERTERS" filed on Nov. 2, 1999 by inventor Rajiv Ramaswami; and also claims the benefit of U.S. Provisional Patent Application No. 60/170,094 entitled "OPTICAL CROSSCONNECT WITH BRIDGING, TEST ACCESS AND REDUNDANCY" filed on Dec. 10, 1999 by inventors Rajiv Ramaswami and Robert Ward; and also claims the benefit of U.S. Provisional Patent Application No. 60/170,095 entitled "OPTICAL CROSSCONNECT WITH LOW-LOSS BRIDGING, TEST ACCESS, AND REDUNDANCY" filed on Dec. 10, 1999 by inventors Steven Clark and Rajiv Ramaswami; and also claims the benefit of U.S. Provisional Patent Application No. 60/170,093 entitled "1+1 OPTICAL PROTECTION USING OPTICAL CROSS-CONNECTS" filed on Dec. 10, 1999 by inventors Rajiv Ramaswami and Robert Ward; and also claims the benefit of U.S. Provisional Patent Application No. 60/170,092 entitled "SIGNALING INTERFACE BETWEEN OPTICAL CROSSCONNECT AND ATTACHED EQUIPMENT" filed on Dec. 10, 1999 by inventor Rajiv Ramaswami; and also claims the benefit of U.S. Provisional Patent Application No. 60/186,108 entitled "1:N PROTECTION BETWEEN CLIENTS AND ALL-OPTICAL CROSSCONNECTS" filed on Mar. 1, 2000 by inventors Kent Erickson, Subhashini Kaligotla, and Rajiv Ramaswami; and also claims the benefit of U.S. Provisional Patent Application No. 60/200,425 entitled "OPTICAL CROSSCONNECT SYSTEM" filed on Apr. 28, 2000 by inventors Rajiv Rarnaswami, Steve Tabaska, and Robert Ward."

BACKGROUND OF THE INVENTION

Over the last few years, the demand for high-speed communication networks has increased dramatically. In many situations, communication networks are implemented with electrical interconnections. That is the interconnections between nodes and networks are made using electronic circuitry such as a transistor switch which blocks or passes electrons. One type of electrical interconnection is an electronic network switch which is well known. The application of electronic network switches to local area networks (LANs), metropolitan area networks (MANs) and wide area networks (WANs) is also well know. A network switch may stand alone or be used in conjunction with or incorporated into other network equipment at a network node. As desired levels of bandwidth and transmission speed for communication networks increase, it will become more difficult for the electrical interconnections to satisfy these levels.

One difficulty associated with electrical interconnections is that they are sensitive to external electromagnetic interference. More specifically, electromagnetic fields that reside in the vicinity of the interconnection lines induce additional currents, which may cause erroneous signaling. This requires proper shielding, which hampered general heat removal.

Another difficulty is that electrical interconnections are subject to excessive inductive coupling, which is referred to as "crosstalk". To alleviate crosstalk, the electrical interconnections must be shielded or abide by fundamental rules of circuit routing so that they are set at a distance large enough to prevent neighboring signals from having any adverse effect on each other, which would reduce network performance.

In lieu of electrical interconnections switching electrons or a voltage and current, optical interconnections offer a solution to the difficulties affecting conventional electrical interconnections. Optical interconnections switch photons or light ON and OFF at one or more wavelengths to provide signaling. An advantage to optical interconnections is that they are not as susceptible to inductive or even capacitive coupling effects as electrical interconnections. In addition, optical interconnections offer increased bandwidth and substantial avoidance of electromagnetic interference. This potential advantage of optics becomes more important as the transmission rates increase and as the strength of mutual coupling associated with electrical interconnections is proportional to the frequency of the signals propagating over these interconnections.

Albeit local or global in nature, many communications network features electronic switching devices to arbitrate the flow of information over the optical interconnections. Conventional electronic switching devices for optical signals are designed to include hybrid optical-electrical semiconductor circuits employing photodetectors, electrical switches, optical modulator or lasers. The incoming optical signals are converted to electrical signals by photodetectors. The electrical signals are amplified and switched by electronic switches to the appropriate output and then converted into optical signals by lasers. One disadvantage associated with a conventional electronic switching device is that it provides less than optimal effectiveness in supporting high data transmission rates and bandwidth.

An alternative approach is to develop an optical cross-connect system which performs switching operations of light pulses or photons (referred to generally as "light signals") without converting and reconverting signals between the optical domain to the electrical domain. However, switching light or photonic signals is different and introduces additional challenges over conventional electrical switching. One of these challenges is fault protection. Failure modes in an optical system typically include a faulty component which can be catastrophic severing a communication channel or causing periodic generation of bit errors.

Another challenge to an optical cross-connect system, is generating status information regarding the data transmission status of the light or optical signals through the optical cross-connect. Yet another challenge in an optical cross-connect system is in creating a reliable optical cross-connect switch. Still yet another challenge in an optical cross-connect system is the ability to completely test such a system. These are challenges because the light or optical signals are not in an electrical form in an all optical cross-connect system and the data format and the data rate of individual channels is unknown to an all optical cross-connect system. Each and every channel can have their light pulses converted into electrical pulses for monitoring but this is an expensive solution which requires an optical to electrical conversion for each and every channel.

SUMMARY OF THE INVENTION

The present invention is briefly described in the claims that follow below.

Briefly, the present invention provides methods, apparatus and systems for performing optical-electrical-optical conversion in an optical cross-connect switch. An optical-to-electrical-to-optical converter (O/E/O) is provided in an optical cross-connect switch to provide the optical-electrical-optical conversion. I/O port cards having an optical-to-electrical-to-optical converter are referred to as smart port cards while I/O port cards without an optical-to-electrical-to-optical converter are referred to as passive port cards. Test port/monitor cards are also provided for testing optical cross-connect switches. Methods, apparatus and systems for performing bridging, test access, and supporting redundant optical switch fabrics are also disclosed. Methods, apparatus and systems for regenerating, monitoring and bridging optical signals through an optical cross-connect switch to provide increased reliability are also disclosed. A self testing method, apparatus and system for an optical cross-connect switch is also disclosed.

BRIEF DESCRIPTION OF THE DRAWINGS

The features and advantages of the present invention will become apparent from the following detailed description of the present invention in which.

Like reference numbers and designations in the drawings indicate like elements providing similar functionality. A letter or prime after a reference number designator represents another or different instance of an element having the reference number designator.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

In the following description, certain terminology is used to describe various features of the present invention. For example, a "module" includes a substrate normally formed with any type of material or materials upon which components can be attached such as a printed circuit board or a daughter card for example. Examples of a "component" include an optical switch, a processing unit (e.g., Field Programmable Gate Array "FPGA", digital signal processor, general microprocessor, application specific integrated circuit "ASIC", etc.), splitters and the like. A "splitter" is an optical component that performs a bridging operation on an input light signal by splitting that light signal into two or more output light signals. Each module features one or more interfaces to transport information over a link. A "link" is broadly defined as one or more physical or virtual information-carrying mediums that establish a communication pathway such as, for example, optical fiber, electrical wire, cable, bus traces, wireless channels and the like. "Information" can be voice, data, address, and/or control in any representative signaling format such as light signals (e.g., light pulses or photons).

I. General Architectural Overview

Figure 1:
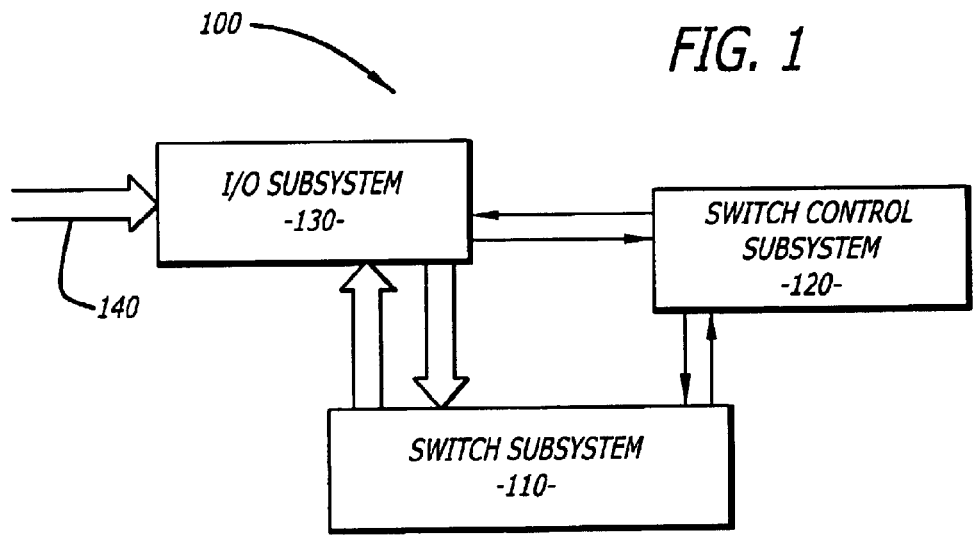
FIG. 1 is a simplified overview of an embodiment of an optical cross-connect switching system.

Referring to FIG. 1, an exemplary embodiment of a simplified overview of an optical cross-connect switching system 100 is shown. Herein, the optical cross-connect switching system 100 comprises three basic units: a switch subsystem 110, a switch control subsystem 120 and an input/output (I/O) subsystem 130. In one embodiment, the modular architecture of the switch subsystem 110, by a method of having replaceable optical switch cores, provides for switch subsystem maintenance in the event of failure within the switch subsystem 110. It is conceivable that further modularity could be achieved by having replaceable subsections within, thus providing for switch matrix maintenance in the event of failure within a switch matrix itself. The modular architecture of both the switch control subsystem 120 and the I/O subsystem 130, each handling a small number of I/O ports in the system 100, provides scalability to the optical cross-connect switching system 100. Thus, additional I/O ports may be subsequently added to the optical cross-connect switching system 100 by adding or removing input/output (I/O) port modules (described below).

The switch subsystem 110 includes optical switches for routing light signals. In one embodiment, the optical switches forming the switch subsystem 110 are micro-machined mirrors; however, it is contemplated that other switch fabrics may be used such as liquid crystal technology. The I/O subsystem 130 receives external light signals 140 and transfers these signals to the switch subsystem 110. The switch control subsystem 120 controls the configuration of the switch subsystem 110 (e.g., mirror orientation) and performs certain monitoring functions. The interconnectivity between the switch subsystem 110, the switch control subsystem 120 and the I/O subsystem 130 includes redundancy so that no equipment failures would cause complete disablement of the system 100.

Figure 2:
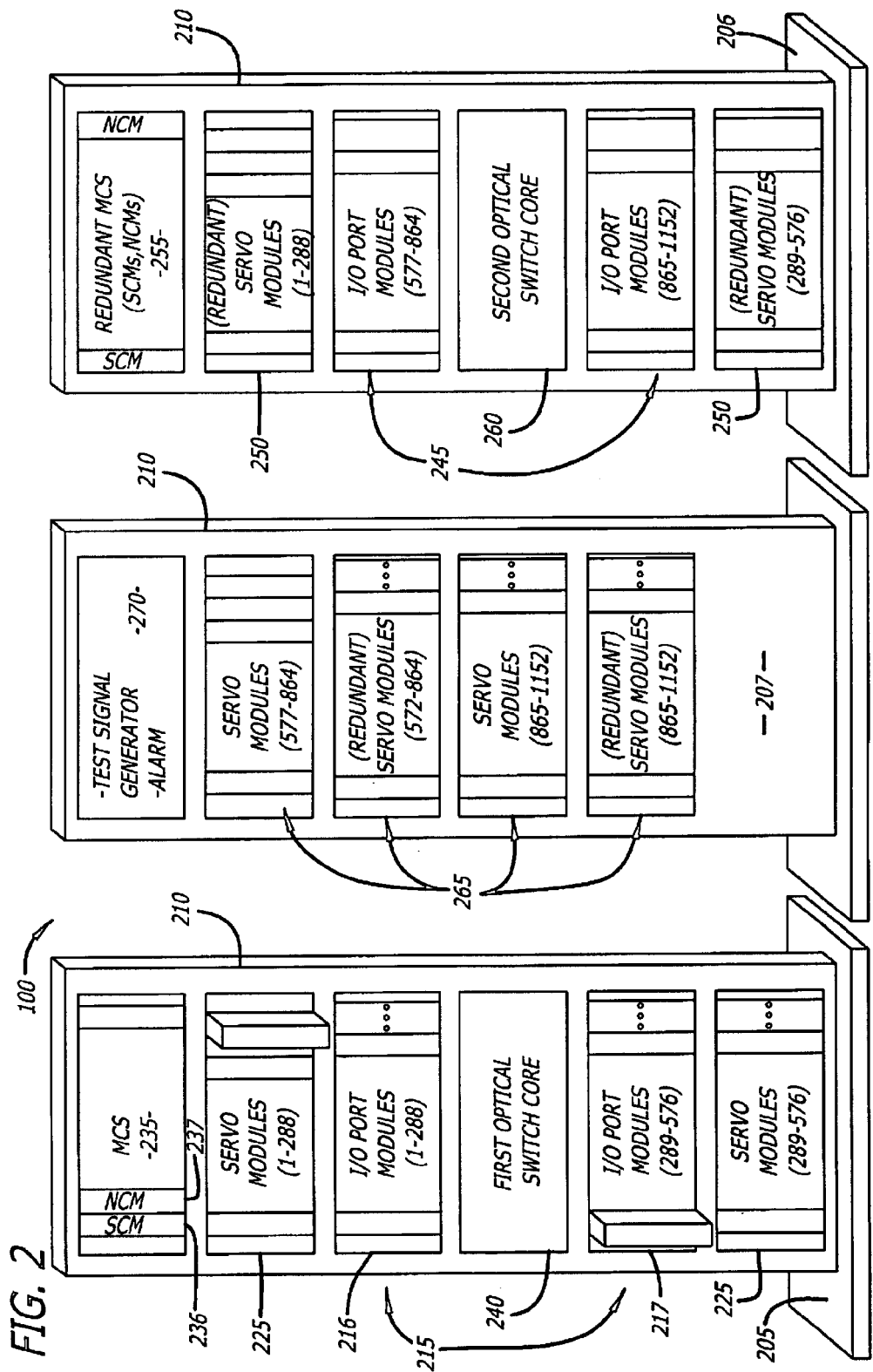
FIG. 2 is a first exemplary embodiment of an optical cross-connect switching system of FIG. 1.

Referring now to FIG. 2, a first exemplary embodiment of an optical cross-connect switching system 100 is shown. In general, the optical cross-connect switching system 100 is a matrix-based optical cross-connect with associated I/O port modules. More specifically, the optical cross-connect switching system 100 is collectively formed by a plurality of platforms 205, 206 and 207 in communication with each other, although the implementation of the switching system 100 as a single platform is another embodiment. Herein, each platform 205, 206 and 207 includes a frame 210 (e.g., a rack) that physically supports I/O port modules forming the I/O subsystem 130 as well as servo modules, servo control modules and/or network control modules of the switch control subsystem 120. The modules are arranged either horizontally or vertically within each platform 205, 206 and 207 and can be individually removed or installed without interfering with immediately adjacent modules. In addition, the frame 210 may also physically support one or more optical switch cores, which may also generally be referred to as "switch fabric," of the switch subsystem 110.

As shown in this embodiment, the first platform 205 comprises (i) a plurality of I/O port modules 215 associated with the I/O subsystem 130 of FIG. 1, (ii) a plurality of servo modules 225 and a management control subsystem (MCS) 235 associated with switch control subsystem 120 of FIG. 1, and (iii) a first (primary) optical switch core 240 associated with switch subsystem 110 of FIG. 1. Similarly, the second platform 206 comprises a plurality of additional I/O port modules 245, a plurality of (redundant) servo modules 250, a management control subsystem 255, and a second (redundant) optical switch core 260. The third platform 207 comprises a plurality of servo modules 265 that control various mirrors of the first and second optical switch cores 240 and 260, which correspond to additional ports associated with I/O port modules 245. Additionally, a light path test signal generator(s), a light path signal monitor(s), circuit breakers and/or alarm visual indication 270 may be located within the third platform 207. For clarity, the elements forming the first platform 205 are described since these elements may be found in the second and/or third platforms 206 and 207.

Figure 3:
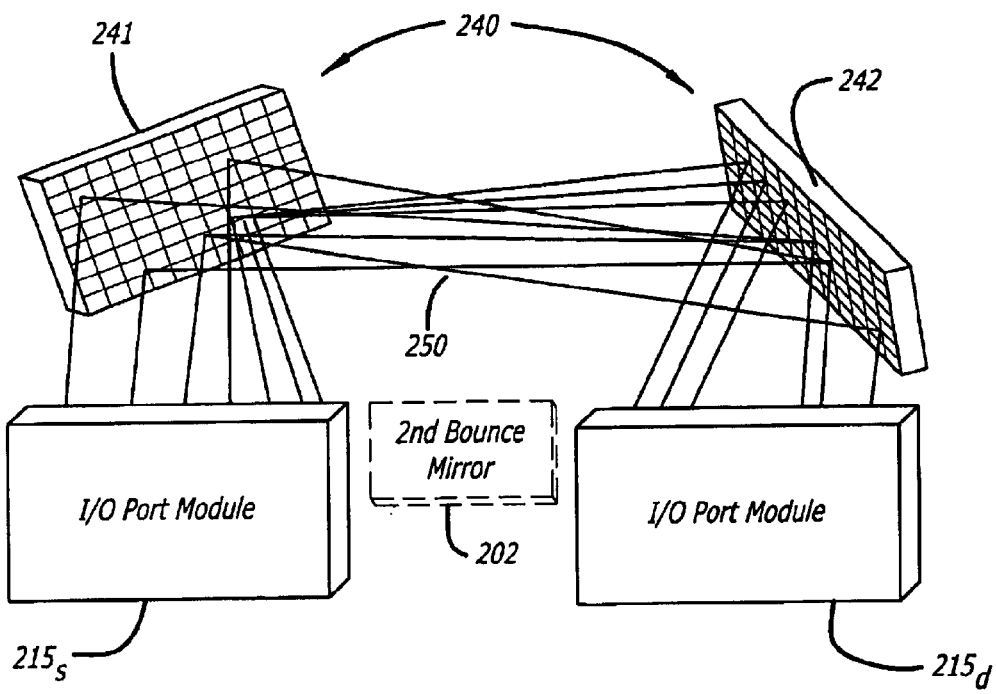
FIG. 3 is an exemplary embodiment of the optical fiber switch matrices forming an optical fiber switch fabric of FIG. 2.
Figure 4:
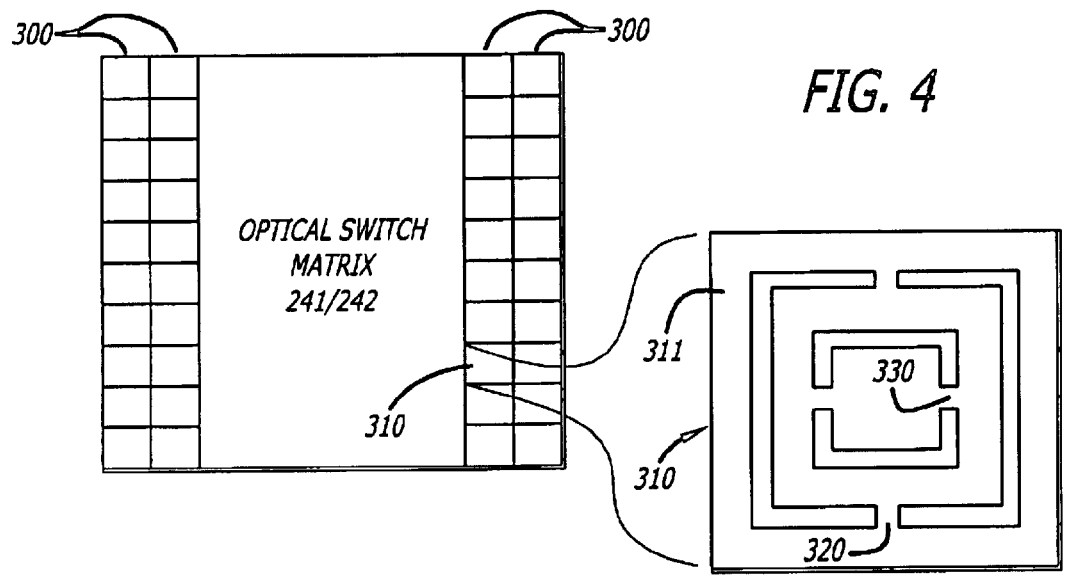
FIG. 4 is an exemplary embodiment of mirror arrays forming an optical fiber switch matrix of FIG. 3.

As shown in both FIGS. 2–4, the first optical switch core 240 includes a first optical switch matrix 241 and a second optical switch matrix 242. These matrices 241 and 242 are collectively positioned to route light signals 250 between a port of a source I/O port module $215_s$ ("s" is a positive whole number) and a port of a destination I/O port module $215_d$ ("d" is a positive whole number), both modules located in any of the platforms 205, 206 and 207 as shown in detail in FIG. 3. Although a two-bounce routing technique is shown, it is contemplated that other light routing techniques may be used including a three-bounce routing technique in which a second bounce mirror 202 optionally shown in FIG. 3 is positioned to assist in routing light signals from one optical switch matrix to another.

As shown in FIG. 4, one embodiment for each of the optical switch matrices 241 and 242 includes multiple arrays 300 of micro-machined mirrors. Each mirror (e.g., mirror 310) features a mirrored surface 311 and torsional flexures 320 and 330 that enable the mirror 310 to adjust its physical orientation to reflect incoming light signals in any selected direction. Herein, both the first and second optical switch matrices 241 and 242 include Q micro-machined mirrors, where "Q" is less than or equal to the maximum number of I/O ports that can be supported by the optical cross-connect switching system 100. For this embodiment, "Q" is greater than or equal to 64 but less than or equal to 1152 ($64 \leq Q \leq 1152$). However, the present invention is not limited to any maximum number of mirrors or I/O ports. It is contemplated, however, that the number of mirrors employed within the first and second optical switch matrices 241 and 242 may differ.

Figure 6:
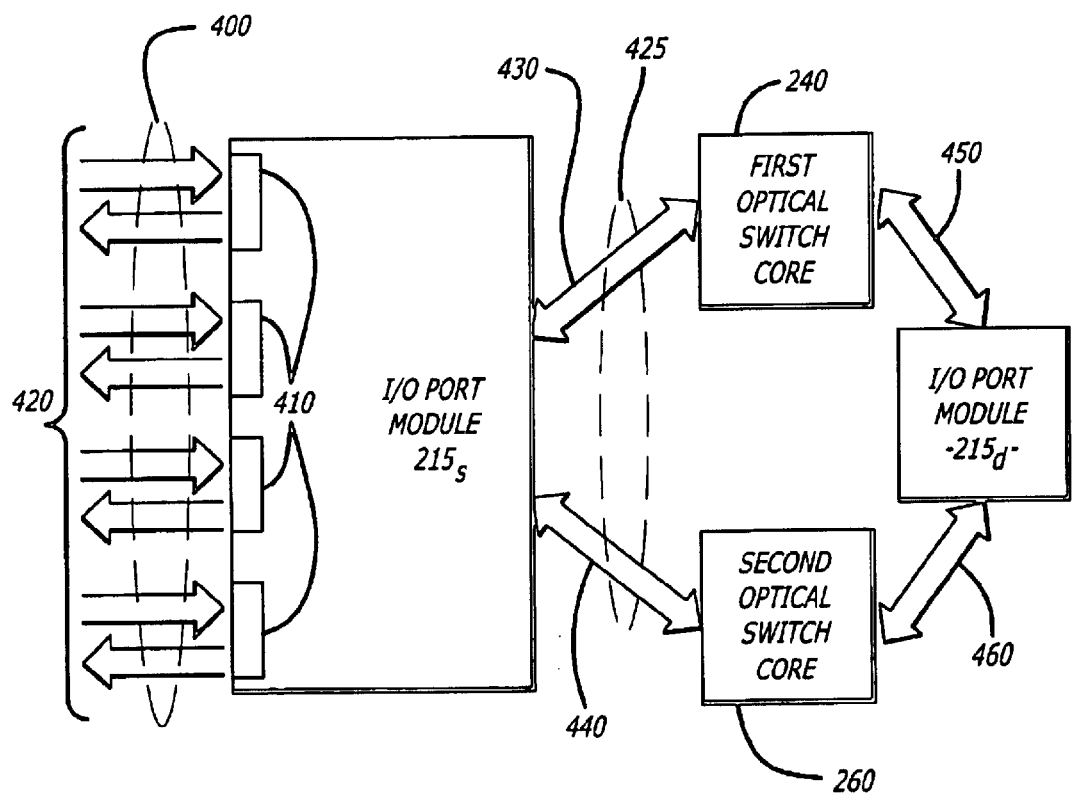
FIG. 6 is an exemplary embodiment of a data path for the transfer of light between I/O port modules and multiple fiber optical switch fabrics of FIG. 2.
Figure 5:
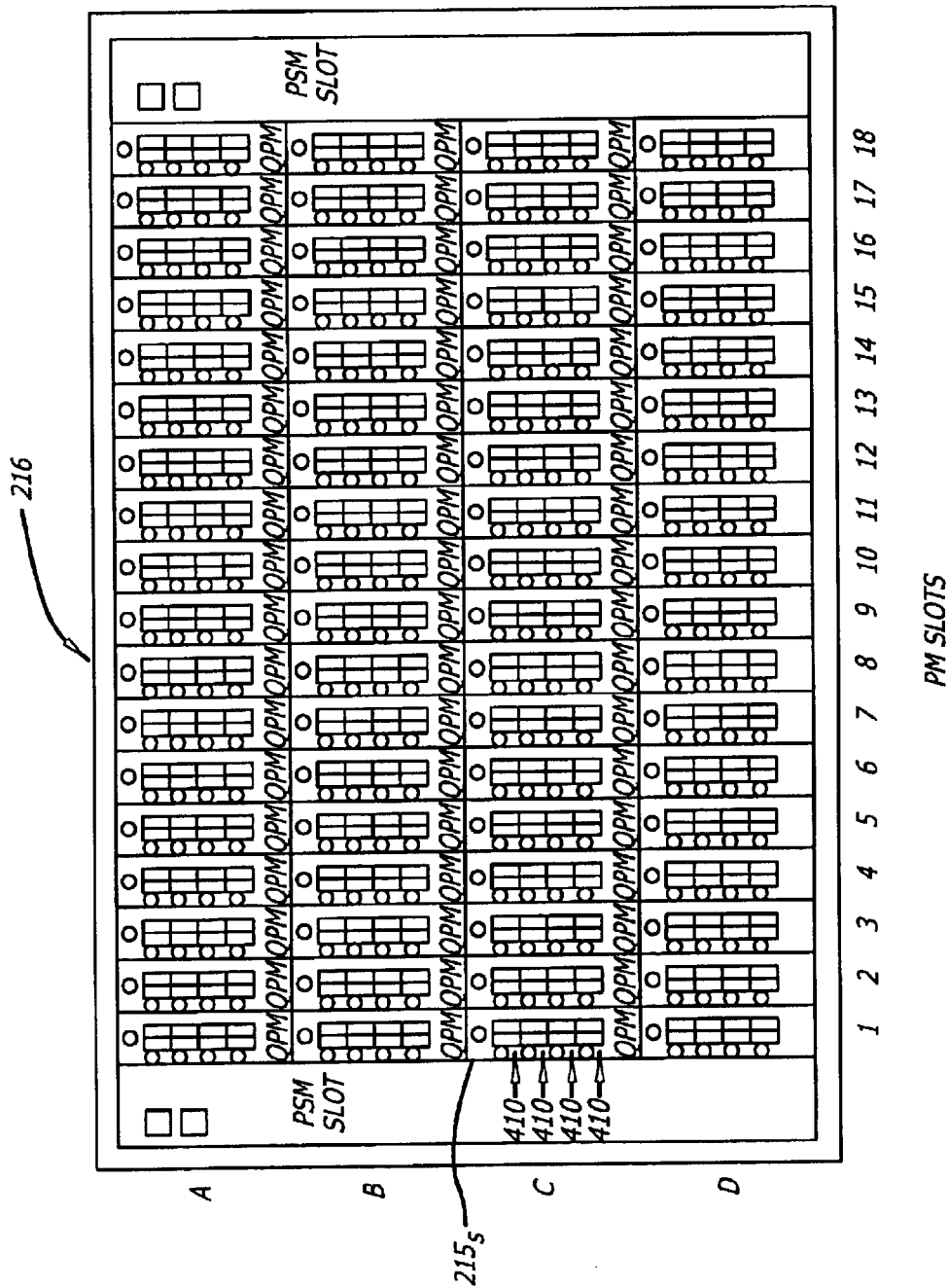
FIG. 5 is an exemplary embodiment of an I/O subsystem featuring a plurality of I/O port modules.

As generally shown in FIGS. 2, 5 and 6, the plurality of I/O port modules 215 features two groups 216 and 217 of I/O port modules. Each group, such as group 216 or 217 for instance, includes up to seventy-two (72) quad-port I/O port modules as shown in FIG. 5 that receive power from one or more power supply modules denoted herein as "PSM". The components forming an I/O port module is described below and shown in FIGS. 8 and 9. Thus, each I/O port module, such as I/O port module $215_s$ for example, features an external interface 400 for a plurality of I/O ports 410 (e.g., four I/O ports). An I/O port 410 features a duplex socket that is adapted to receive a duplex pair of optical fiber links, one optical fiber link routes a light signal to the I/O port 410 while the other routes light signals from the I/O port 410. This support bi-directional optical connections. There is a small percentage (e.g., less than 15%) of these I/O ports, however, that may be assigned as test access ports as described below.

Moreover, as shown in FIG. 6, upon receiving an incoming light signal over an optical fiber link 420, the I/O port module 215, performs a bridging operation by splitting the incoming light signal into multiple (two or more) bridged light signals for routing to the first and second optical switch cores 240 and 260. The bridged light signals are routed through an internal optical interface 425 featuring optical fiber ribbon links 430 and 440. For this embodiment, the "optical fiber ribbon links" are ribbon cables having multiple optical fiber lines (e.g., two lines from each I/O port). The first optical switch core 240 provides a primary optical path. The second optical switch core 260 provides a redundant optical path in the event the first optical switch core 240 is not operating properly. The optical switch cores 240 and 260 route the bridged light signals to a selected port of a destination I/O port module (e.g., I/O port module $215_d$) via optical fiber ribbon links 450 and 460.

Figure 7:
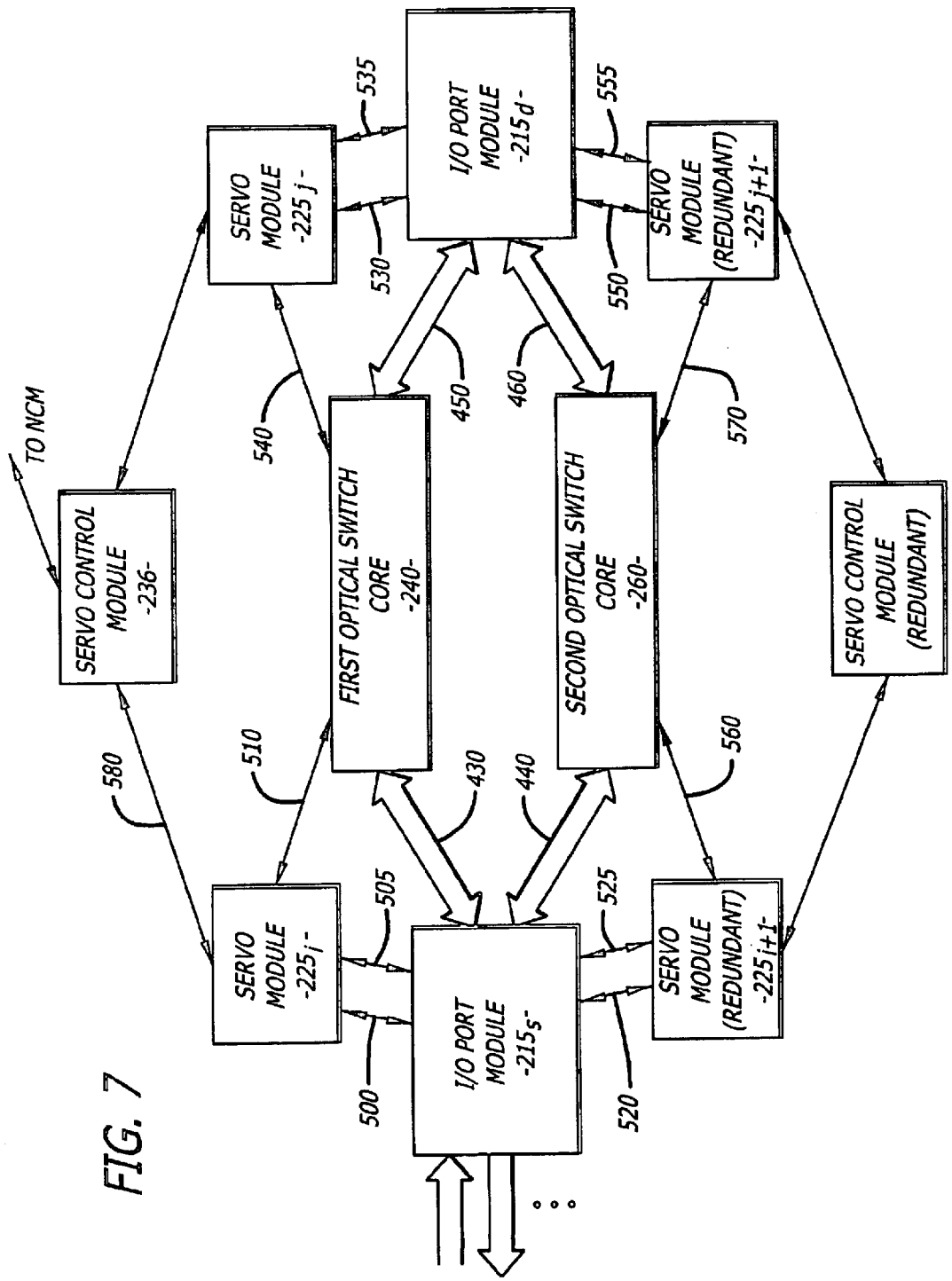
FIG. 7 is an exemplary embodiment of a control path featuring the interconnections between the I/O port module and servo modules.

Upon receiving light signals from both the first and second optical switch cores 240 and 260, the I/O port module $215_s$ provides small percentage optical tap signals of the received light paths to the respective servo modules, which in turn determine light signal quality. The respective servo modules will convey light signal quality for each respective light path to the I/O port module, using a digital protocol over an electrical communication link 505 to the I/O port module as shown in FIG. 7. The I/O port module 215, will in turn, determine (i.e. select) which light signal has the higher signal quality and outputs that signal via interface 400. In most cases, the signal quality of the two light paths presented to the I/O port module will be of the same signal quality and may have a relatively low optical loss of approximately seven decibels (7 dB) or less.

Referring now to FIGS. 2 and 7, each servo module 225 is configured to receive optical tap signals from one or more I/O port modules. Herein, servo module $225_i$ is configured to receive optical tap signals via link 500 from I/O port module $215_s$. These optical tap signals provide feedback to indicate a percentage of the bridged light. signals and also allow for light to be injected under certain conditions. In response to receiving optical tap signals via link 500, the servo module $225_i$ provides mirror control signals over link 510 to the first optical switch core 240. The mirror control signals are routed via a unique communication path to an optical switch (e.g., a micro-machined mirror) and are associated with the port of the I/O port module $215_s$ through which the incoming light signal was routed. The mirror control signals are used for proper adjustment of the physical orientation of the mirror.

The I/O port module 215d provides optical tap signals over link 530 to servo module $225_j$. In response to receiving the optical tap signals from I/O port module $215_d$, the servo module $225_j$ provides mirror control signals via link 540 to the first optical switch core 240. The mirror control signals are routed via a unique communication path to a micro-machined mirror associated with a selected port of the I/O port module $215_d$ from which the light signal would be output. Herein, sensing the optical tap (feedback) signals, the servo module $225_j$ determines the light signal quality and conveys light signal quality information for each light path using a digital protocol over (electrical) link 535. Thereafter, the I/O port module 215d chooses the selected port (i.e. port having the best light signal quality).

Collectively, the optical tap signals, mirror control signals and light signal quality information, which are routed over links 500, 510, 530, 540, 505 and 535, are used by servo modules $225_i$ and $225_j$ for adjustment of the physical orientation of mirrors to make a connection between I/O port module $215_s$ and $215_d$.

Additionally, I/O port modules $215_s$ and $215_d$ also transfer optical tap signals via links 520 and 550, respectively. Similar to the above description, these optical tap signals establish the redundant optical path by altering the physical orientation of one or more micro-machined mirrors of the second optical switch core 260 using mirror control signals over links 560 and 570 and light signal quality information via links 525 and 555.

Figure 11:
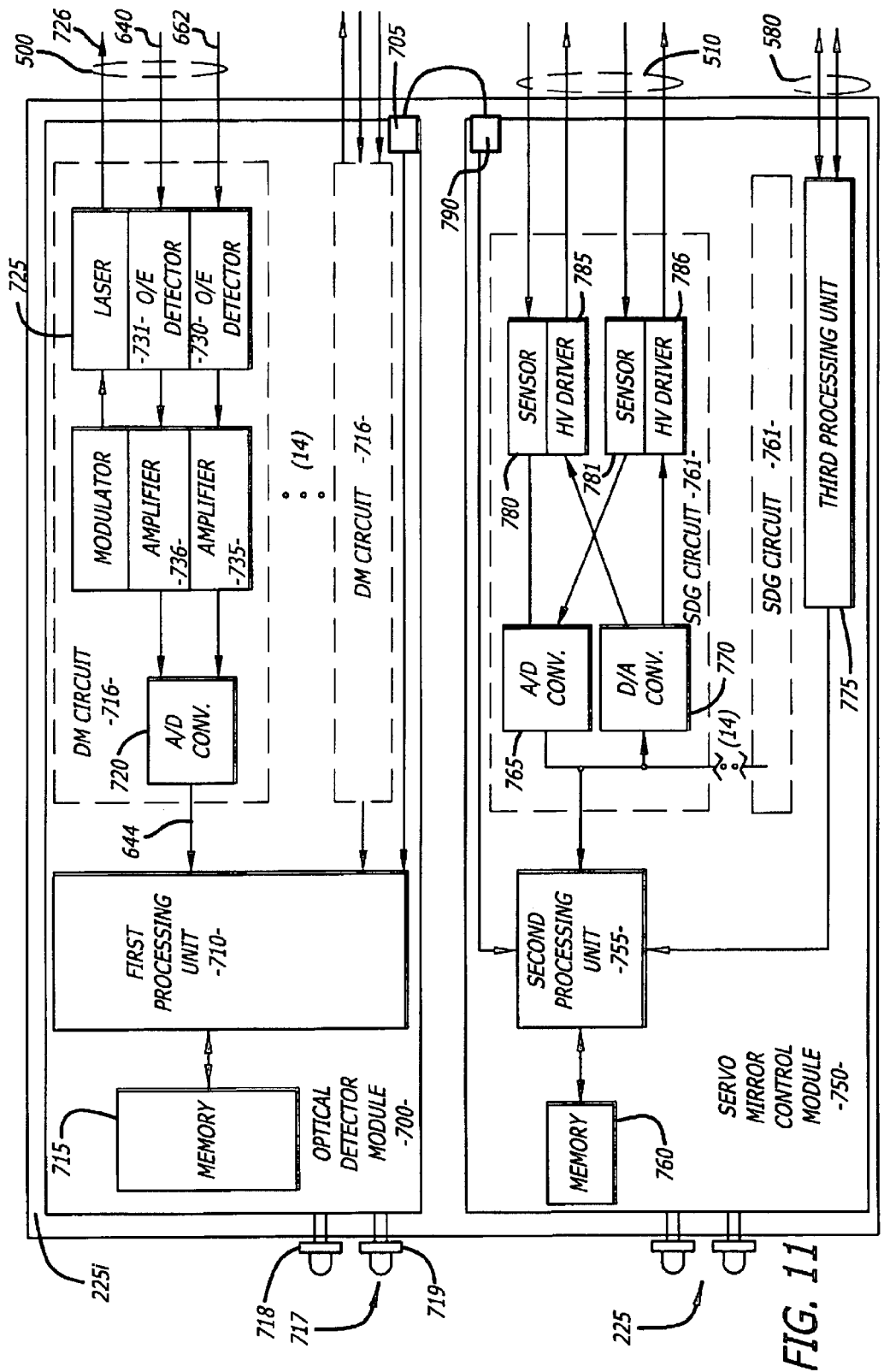
FIG. 11 is ah exemplary embodiment of a servo module of the optical cross-connect switching system of FIG. 1.

In the event that no optical power is presented to the I/O port module $215_s$, a substitute light signal may be injected from the servo module $225_i$ via link 500. An alignment laser may be used as shown in FIG. 11 described below. This process of light substitution allows for connection establishment and verification when no input light is present to the I/O port module $215_s$. The substitute light source can be within the same wavelength range (e.g. 1100 nanometers "nm"–1700 nm) as the allowed input light signal range. In one embodiment, the light source or method of injection would be chosen to not interfere with attached equipment's select operational wavelength range. Choosing a different wavelength source on the servo module and/or a wavelength specific splitter and/or filter on the I/O port module could do this particular embodiment.

The management control subsystem 235 (see FIG. 2) enables communications between two or more servo modules placed within the same or different platforms. The management control subsystem 235 includes at least one servo control module 236 and an optional network control module 238. In one embodiment, the servo control module (SCM) 236 ensures communication between at least servo modules $225_i$ and $225_j$ that control mirrors associated with the first optical switch core 240. The network control module (NCM) 238 manages the execution of connection configurations for the whole cross-connect switching system and ensures communications between multiple servo control modules 236 and 237. The same architecture is used to control optical switches within the second optical switch core 260 as shown.

II. General Architecture of the I/O Port Modules

Figure 8:
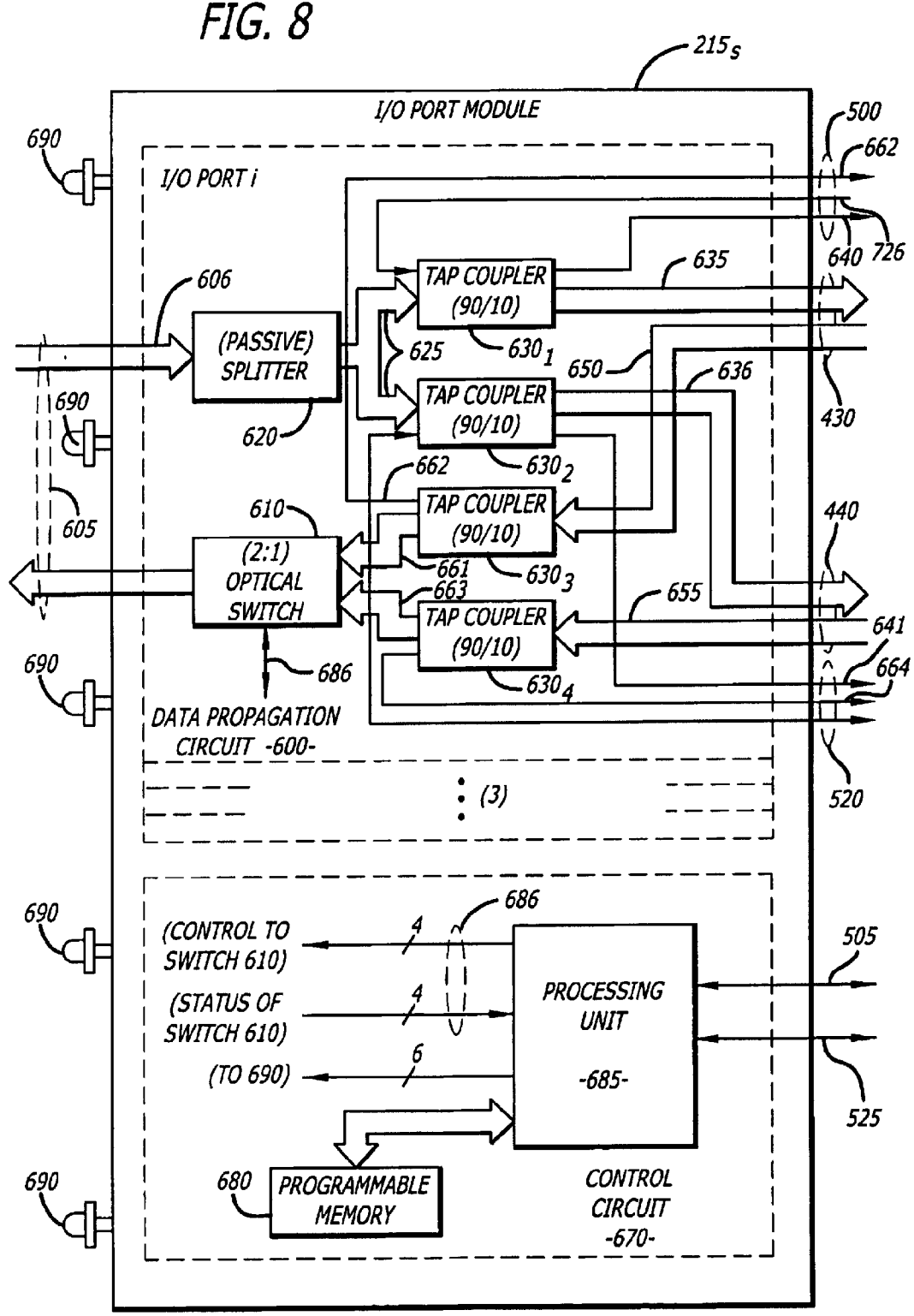
FIG. 8 is an exemplary embodiment of the I/O port module of FIGS. 6 and 7 illustrating a data propagation circuit and a control circuit.
Figure 9:
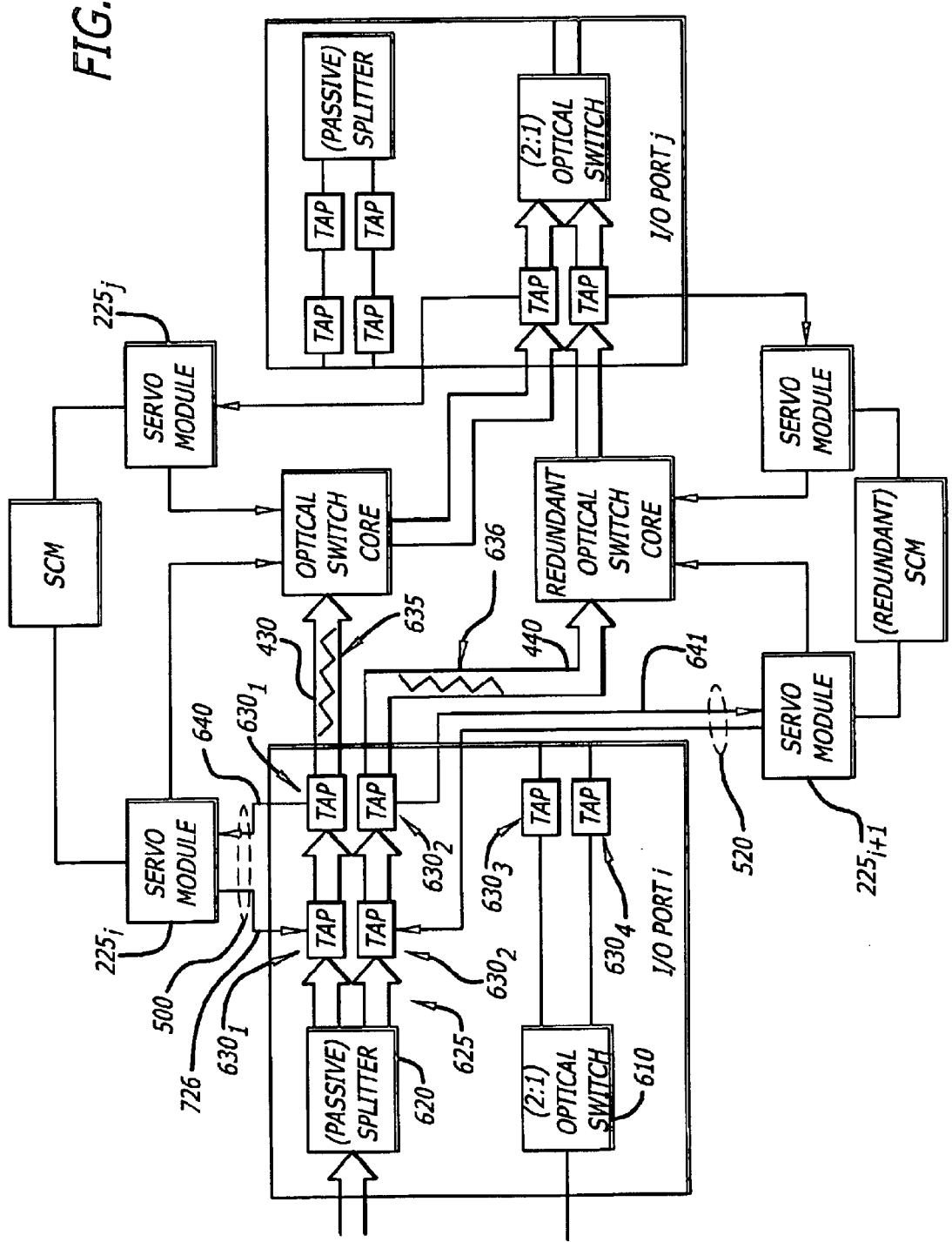
FIG. 9 is an exemplary embodiment of multiple ports of I/O modules in communication with optical switches controlled by servo modules.

Referring now to FIGS. 8 and 9, an exemplary embodiment of an I/O port module (e.g., I/O port module $215_s$) and its communications over optical switch cores 240 and 260 is shown. I/O port module $215_s$ includes a data propagation circuit 600 for each I/O port and a control circuit 670. Thus, in the event that the I/O port module $215_s$ is configured with four I/O ports, four data propagation circuits are implemented on the I/O port module $215_s$ as represented. Only the data propagation circuit 600 for one of the I/O ports of I/O port module $215_s$ (e.g., $i^{th}$ I/O port) is shown in detail for clarity sake.

In one embodiment, the data propagation circuit 600 comprises an optical switch 610, a (passive) splitter 620 and a plurality of tap couplers $630_1$–$630_4$. The plurality of tap couplers $630_1$–$630_4$ correspond to the pairs of optical fibers found in optical fibber ribbon links 430 and 440. The control circuit 670 comprises a programmable memory 680, a processing unit 685 and status identification components 690.

As shown, each port of the I/O port module 2155 supports full-duplex communications. Thus, an incoming light signal 606 received over port 605 is routed to the splitter 620. The splitter 620 effectively performs a bridging operation by splitting the incoming light signal 606 into bridged light signals 625, which collectively have the same power level (energy) as the light signal 606. In one embodiment, when the splitter 620 is a 50/50 splitter, the bridged light signals 625 have equal power levels. However, it is contemplated that splitter 620 may produce bridged light signals 625 having disproportionate power levels.

The bridged light signals 625 are routed through the tap couplers $630_1$ and $630_2$. Attached to servo module $225_i$ and servo module $225_{i+1}$ via optical tap links 500 and 520, the tap couplers $630_1$ and $630_2$ are used to monitor the power level of light signals 635 and 636 propagating through optical fiber ribbon links 430 and 440 (referred to as "outgoing light signals"). This enables the servo modules $225_i$ and $225_{i+1}$ to verify the connectivity of the splitter 620 to optical fiber ribbon links 430 and 440 and to detect unacceptable variances in optical performance of the light signal. As shown for this embodiment, the tap couplers $630_1$ and $630_2$ may separate the bridged light signals into signals having disproportionate power levels in order to maximize the power levels of the outgoing light signals propagating through optical fiber ribbon links 430 and 440. For example, where the tap couplers $630_1$ and $630_2$ may operate as 90/10 splitters, the outgoing light signals 635 and 636 have ninety (90%) of the total power level of the bridged light signal while the tap optical signals 640 and 641 have only ten percent (10%).

Referring to FIG. 8, tap couplers $630_3$ and $630_4$ are configured to receive incoming light signal 650 and 655 via optical fiber ribbon links 430 and 440, respectively. The tap couplers $630_3$ and $630_4$ effectively separate the light signals 650 and 655 into corresponding pairs of light signals having disproportionate power levels (e.g., signals 661, 662 and 663, 664). Signals 662 and 664 having the lower power level are provided to the servo module $225_i$ and servo module $225_{i+1}$ via links 500 and 520 for monitoring the power levels of the light signals 661 and 663, without the light signals 661 and 663 experiencing substantial signal degradation. The signals 662 and 664 may be light signals that undergo OE conversion at the I/O port module $215_s$ or at the servo modules $225_i$ and $225_{i+1}$ as shown in FIG. 11. The tap couplers $630_3$ and $630_4$ are shown as 90/10 splitters; however, tap couplers $630_3$ and $630_4$ may be any selected ratio, including 50/50.

The light signals 661 and 663 are routed to the optical switch 610 of a destined I/O port. The control circuit 650 on the I/O port module $215_s$ determines which of the pair of light signals 661 and 663 has the best signal quality based on conveyed light signal quality information from the servo modules via links 505 and 525 as briefly described below. Parameters used to determine light signal quality include measured optical signal intensity/power, extinction ratio, and the like. The light signal quality information to the I/O port module may be conveyed as failed due to the servo module service operations, high bit error rate, an external light path has failed, and the like. The light signal 661 or 663 with the best signal quality is output through the I/O port 605. Of course, it is contemplated that the light signal output operations described for I/O port i are applicable to I/O port j as shown.

Figure 10:
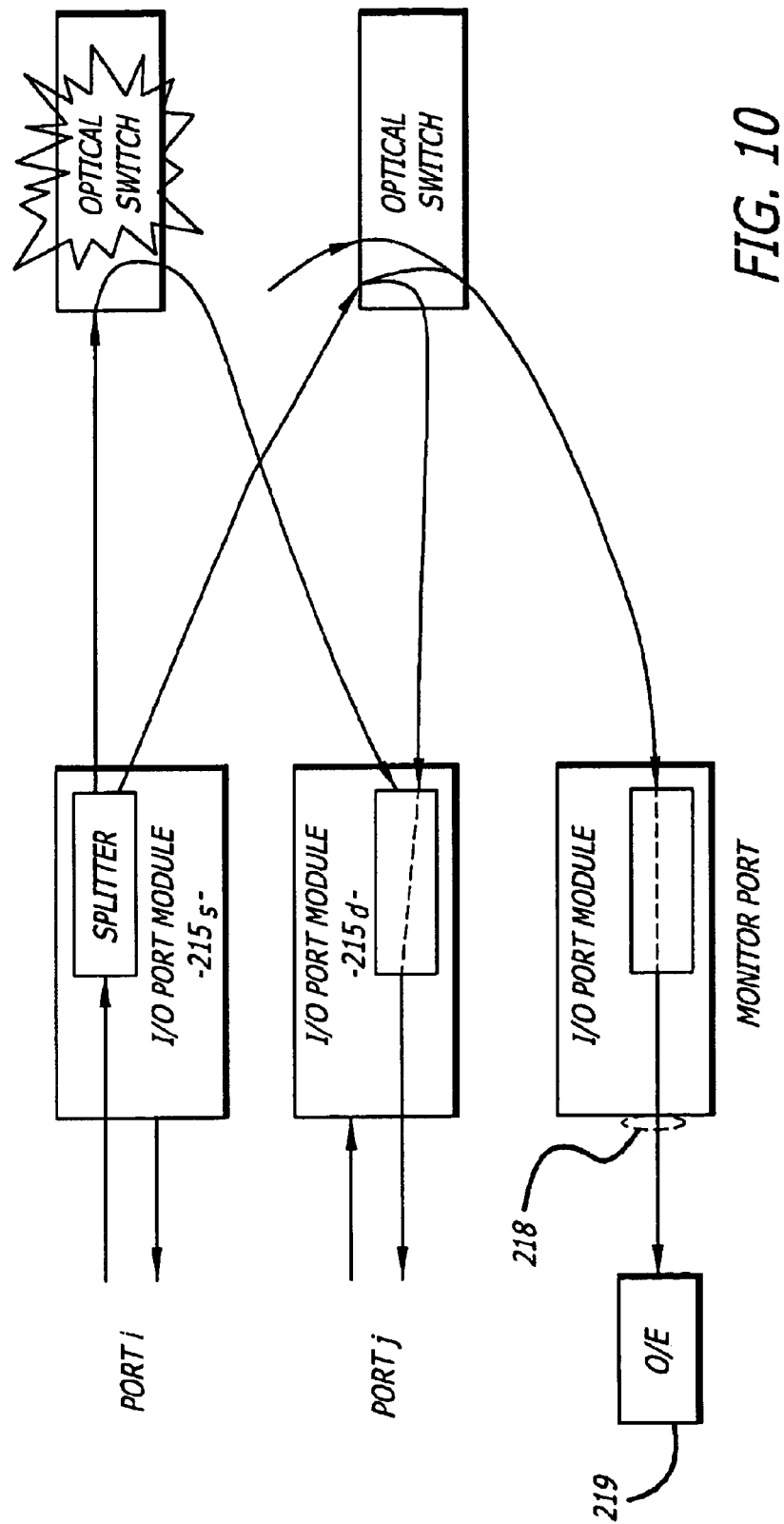
FIG. 10 is an exemplary embodiment of an I/O port configured as a test access port.

It is contemplated that an I/O port of the I/O port module $215_s$ may be configured as a test access port. A "test access port" is an I/O port that is used for monitoring light signals routed through another port. Normally, the test access port receives a portion of the power level of a light signal routed through a selected optical switch (e.g., micro-machined mirror). For example, as shown in FIG. 10, an I/O port 218 of the I/O port module $215_s$ is configured for coupling with a monitoring device 219 (e.g., a bit error rate "BER" monitor in combination with an optical-electrical "O/E" converter, etc.) to monitor a power level of a light signal routed to the $i^{th}$ I/O port from an optical switch.

Referring back to FIG. 8, the control circuit 670 comprises the programmable memory 680 in communication with the processing unit 685 (e.g., FPGA). The programmable memory 680 contains software and other information used by the processing unit 685 to provide selection of the best quality signal based on digital electrical signaling from servo module $225_i$ and servo module $225_{i+1}$ over links 505 and 525, respectively. Also, programmable memory 680 includes information used by the processing unit 685 to control the state of the status identification components 690 (e.g., light emitting diodes "LEDs"). The state of the status identification components 690 identifies (1) whether each I/O port is operational and/or (2) whether the I/O port module is operational. The processing unit 685 is further in communications with optical switches of each data propagation circuit employed in the I/O port module $215_s$ in order to receive switch status signals and provide switch control signals. As shown for clarity, processing unit 685 provides optical switch 610 with switch control signals for receiving switch status signals and selecting either light signal 661 or light signal 663.

III. General Architecture of the Servo Modules

Referring now to FIG. 11, an exemplary embodiment of the servo module (e.g., servo module $225_i$) is shown. In one embodiment, the servo module $225_i$ comprises two separate modules in communication over connectors 705 and 790. These separate modules are referred to as an "optical detector module" 700 and a "servo mirror control module" 750.

The optical detector module 700 comprises a first processing unit 710, memory 715, a plurality of detection/modulation (DM) circuits 716 and status identification components 717. As shown, the optical detector module 700 features sixteen (16) DM circuits 716 to support four (4) quad-port I/O port modules. Each DM circuit 716 includes an analog-to-digital (A/D) converter 720, a laser 725, optical-electrical (O/E) detectors 730 and 731, and optional amplifiers 735 and 736.

The servo mirror control module 750 comprises a second processing unit 755, a memory 760, a plurality of mirror signal detection and generation (SDG) circuits 761, a third processing unit 775 and status identification components 795. The SDG circuits 761 correspond in number to the DM circuits 716 of the optical detector module 700. Each SDG circuit 761 features an A/D converter 765, a digital-to-analog (D/A) converter 770, hinge position sensors 780–781 and high voltage (HV) mirror drivers 785–786.

As shown in FIG. 11, the optical detector module 700 is removably coupled to the servo mirror control module 750. This allows the optical detector module 700 to be "hot swapped" from a backplane, which features connectors 705 and 790 connecting the optical detector module 700 to the servo mirror control module 750, without disrupting the servo mirror control module's 750 ability to hold the mirrors in their existing positions for an extended period of time. This "hot swapping" of the optical detector module 700 allows for repair or upgrade of the optical detector module 700. Optical detector module 700 receives optical tap (feedback) signals 640 and 662 from one or more I/O port modules (e.g., I/O port module $215_s$ via link 500) and can transmit optical control signals 726 from the laser 725 for alignment of light signals transferred between two I/O port modules. The optical tap signal 640 is based on an input light signal that is routed to the switch fabric.

More specifically, with respect to servo module $225_i$, the O/E detectors 730 and 731 are coupled to tap couplers $630_1$ and $630_3$ of FIGS. 8–9. More specifically, the O/E detectors 730 and 731 are configured to detect incoming, optical tap signals 640 and 662, convert the optical tap signals 640 and 662 into corresponding electrical control signals measuring a power level of the outgoing light signal, and optionally route the electrical control signals to corresponding amplifiers 735 and 736. The (amplified) electrical control signals are provided to the A/D converter 720. The A/D converter 720 converts the electrical control signals into measured power sense signals 644 of a digital form. The measured power sense signals 644 are provided to the first processing unit 710.

Herein, the first processing unit 710 may perform a number of operations based on the electrical control signals such as threshold crossing, LOS integration, input/output power ratio analysis and the like. Software and other information necessary for performing these operations may be obtained from the memory 715 by the first processing unit 710. Herein, memory 715 can be non-volatile memory such as non-volatile random access memory, electrically erasable programmable read only memory (EEPROM) and the like.

The optical detector module 700 includes multiple status identification components 717 (e.g., light emitting diodes "LEDs"). A first LED 718 identifies whether any operational faults associated with the servo module $225_i$ have occurred. A second LED 719 indicates when the optical detector module 700 is in service.

Referring still to FIG. 11, in this embodiment, the servo mirror control module 750 comprises the second processing unit 755 that is coupled to both the first processing unit 710 and the third processing unit 775. For instance, in order to adjust the switch fabric in response to the measured power sense signals 644, the second processing unit 755 receives information representative of the measured power sense signals from the first processing unit 710 via connectors 705 and 790. The second processing unit 755 further receives information representative of measured power sense signals for the light signal at a targeted I/O port. This information is provided by the SCM 236 over link 580 via the third processing unit 775. This assists in reducing errors in adjusting the torsional flexures of the mirrors.

Upon receipt of these measured power readings, the second processing unit 755 controls a particular SDG circuit corresponding to a mirror associated with the I/O port over which the tapped light signal was routed. The control involves slight mirror orientation adjustments if the power level readings differ substantially.

In particular, a first hinge position sensor 780 senses a position of a mirror via link 510 from the first optical switch core 240. The sensed position signal is routed to the A/D converter 765, which is subsequently placed in a digital format before routing to the second processing unit 755. When the servo module $225_i$ is adjusting the switch fabric, the second processing unit 755 transfers mirror control signals to the D/A converter 770. The mirror control signals are routed to HV driver 785 and applied to a selected mirror of the first optical switch core in order to adjust the amount of torsional flexure along a first dimensional plane (e.g., X-axis). This is accomplished to minimize the loss experienced by the light signal.

A second hinge position sensor 781 senses a position of a mirror for the first optical switch core along a second dimensional plane (e.g., Y-axis). The sensed position signal is routed to the A/D converter 765, which is subsequently placed in a digital format before routing to the second processing unit 755. When the servo module $225_i$ is adjusting the switch fabric, the second processing unit 755 transfers mirror control signals to the D/A converter 770. The mirror control signals are routed to HV driver 786 and are applied to the selected mirror of the first optical switch core in order to adjust the amount of torsional flexure along the second dimensional plane. The specifics of the hinge position sensors 780 and 781 are described in a PCT application entitled "Micromachined Members Coupled for Relative Rotation By Torsional Flexure Hinges" (International Publication No. WO 00/13210) published on or around Mar. 9, 2000.

In another embodiment, when I/O port module $215_s$ is the destination of a light signal, the second processing unit 755 receives information representative of the measured power sense signals associated with the optical tap signal 662 that has been analyzed by the first processing unit 710. The optical tap signal 662 is based on an output light signal being routed from an I/O port. In this situation, the third processing unit 775 receives information associated with the measured power sense signals from a source I/O port as reported by SCM 236 over link 580.

IV. Redundant Architecture of the Optical Cross-Connect Switching System

Figure 12:
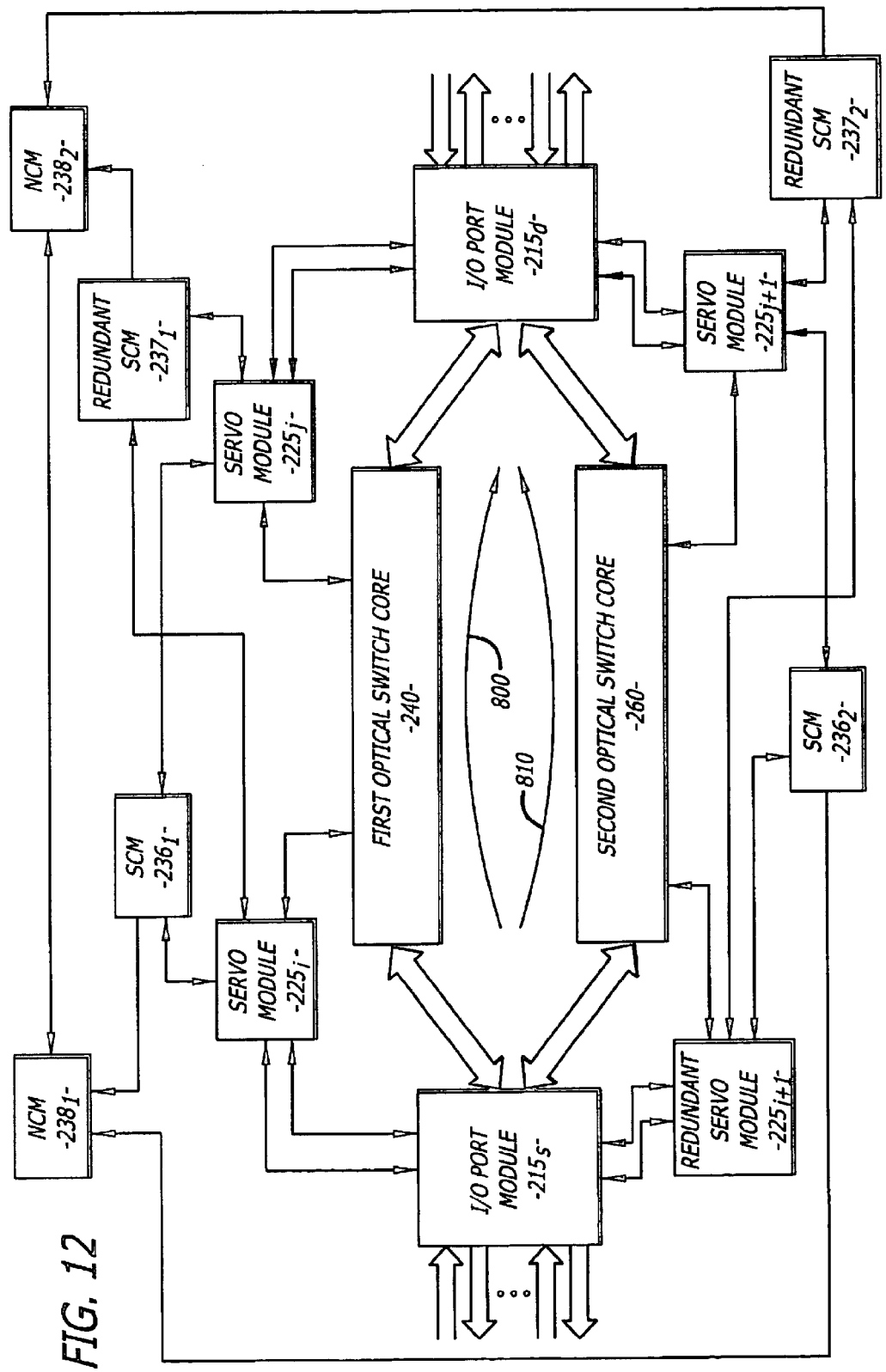
FIG. 12 is an exemplary block diagram of a redundant architecture of the optical cross-connect switching system of FIG. 1.

Referring now to FIG. 12, a block diagram of an alternative embodiment of the architecture of the optical cross-connect switching system of FIG. 1 is shown which includes redundant protection capabilities. Redundancy is desired in order to increase the reliability of such an optical cross-connect switching system. Aside from the I/O port modules, all other modules are duplicated to obtain the desired redundancy. Thus, it is necessary for light signals from a source I/O port module $215_s$ to be routed to a destination I/O port module $215_d$ through two optical paths, namely a primary optical path 800 using a first optical switch core 240 and a redundant optical path 810 using a second optical switch core 260.

With respect to the primary optical path 800, a servo module $225_i$ is connected to both the source I/O port module 215S and the first optical switch matrix (not shown) of the first optical switch core 240. In particular, the servo module $225_i$ controls the physical orientation of a mirror of the first optical switch matrix that corresponds to the source I/O port module $215_s$. To establish and maintain the primary optical path 800 for the light signal, the servo module $225_i$ needs to communicate with other servo modules such as servo module $225_j$. Thus, a servo control module (SCM) is implemented to support such communications, possibly through a time-slot switching arrangement.

As shown, the SCMs $236_1$–$236_2$ are also duplicated so that each servo module 225 is connected to at least two SCMs $236_1$–$236_2$. Thus, in the event that the SCM $236_1$ fails, the primary optical path 800 remains intact because communications between the servo modules $225_i$ and $225_j$ are maintained via redundant SCM $237_1$. The transfer is accomplished by temporarily halting the adjustment of (i.e. freezing) the mirrors inside the first optical switch core 240 while control is transferred from SCM 236 to SCM $237_1$. The SCMs $236_1$ and $237_1$ associated with the first optical switch core 240 are in communication via a network control modules (NCMs) $238_1$ and $238_2$ for example.

With respect to the redundant optical path 810, a servo module $225_{i+1}$ is connected to both the source I/O port module $215_s$ and one or more mirror(s) of a first optical switch matrix (not shown) of the second optical switch core 260. Another servo module $225_{j+1}$ is connected to both the destination I/O port module $215_d$ and one or more mirror(s) of a second optical switch matrix (not shown) of the second optical switch core 260. The orientation of these mirrors produces the redundant optical path 810.

To establish and maintain the redundant optical path 810 for the light signal, a SCM $236_2$ may be implemented with a dedicated time-slot switching arrangement in order to support continuous communications between the servo module and another redundant servo module associated with the destination I/O port module. As shown, the SCM $236_2$ is also duplicated so that each servo module $225_{i+1}$ and $225_{j+1}$ is connected to at least two SCMs $236_2$ and $237_2$. Thus, the redundant optical path 810 is maintained even when one of the SCMs $236_2$ and $237_2$ fails. The SCMs $236_2$ and $237_2$ associated with the second optical switch core 260 communicate via the first NCM 238 and the second NCM 238$_2$, respectively. The second NCM 238$_2$ is in communication with the first NCM 238$_1$ to allow all SCMs and servo modules to communicate for coordination of the primary optical path 800 and the redundant optical path 810.

V. Signaling Interface

Figure 13:
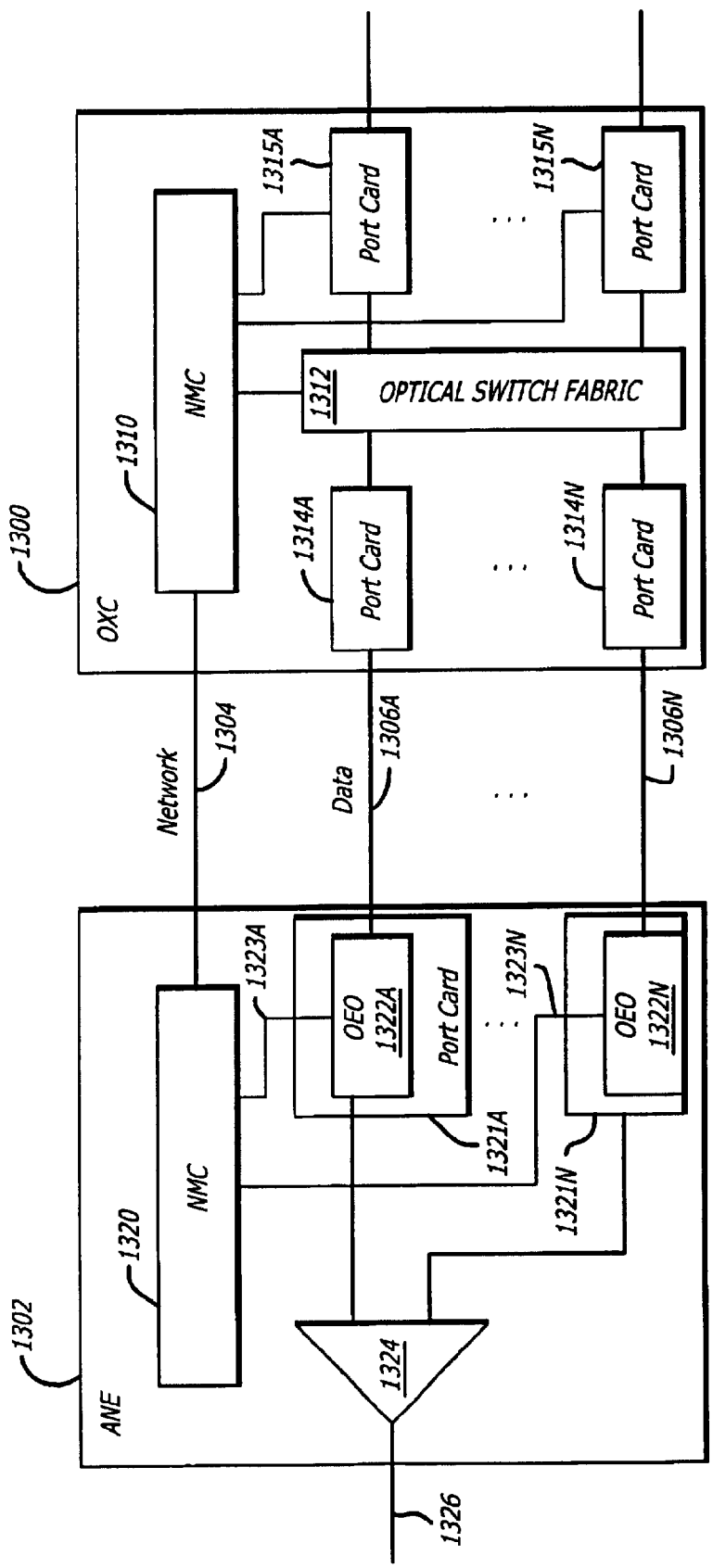
FIG. 13 is a block diagram illustrating an out-of-band signaling interface between an optical cross-connect switch and attached network equipment.

The present invention includes alternate embodiments for realizing a signaling interface between optical cross-connect switches and attached network equipment (ANE). Referring to FIG. 13, optical cross-connect switches (OXCs) 1300 are deployed in a telecommunications network. An optical cross-connect switch can also be referred to herein as optical cross-connect switching system, OXC, or optical cross-connect. Attached to the optical cross-connect switches in a telecommunications network is one or more pieces of attached network equipment (ANE) 1302. The attached network equipment (ANE) 1302 includes telecommunication network devices such as a wavelength division multiplexed (WDM) line terminals, SONET add/drop multiplexers, internet protocol (IP) routers, additional optical cross-connect switches and Asynchronous Transfer Mode (ATM) switches which are also collectively referred to as client equipment. WDM line terminals provide interconnection between sites and are also terminating devices included in SONET add/drop multiplexers, internet protocol (IP) routers, or Asynchronous Transfer Mode (ATM) switches. The present invention establishes a signaling interface between the optical cross-connects 1300 and attached network equipment (ANE) 1302.

There are a number of reasons for establishing a signaling interface between the optical cross-connects 1300 and attached network equipment (ANE). One reason is to allow the other network equipment in the telecommunications network to provision connections through the OXC. It is very desirable to allow other equipment to set up a connection through the OXC in an automated manner, rather than manually provisioning such connections. Another reason is to provide real-time performance monitoring and other management information to the optical cross-connects 1300 from the attached network equipment 1302. By providing a signaling interface where performance information is provided back to the optical cross-connects 1300, expensive monitoring elements are not needed inside the optical cross-connects 1300 and costs are saved. The attached network equipment usually already have electronic components for monitoring signals, such as optical-to-electrical-to-optical converters (OEOs or O/E/Os), in order to extract such information from optical signals. Thus, the electronics for monitoring do not need to be duplicated inside the optical cross-connects 1300 when they are already provided in the attached network equipment 1302. Instead the optical cross-connects 1300 can obtain the real-time performance monitoring and other management information from the other network equipment that is attached to the optical cross-connects 1300 through a signaling channel. Another reason to establish a signaling interface is so that the attached network equipment 1302 can obtain monitoring and other management information real-time from the optical cross-connects 1300. The optical cross-connects 1300 can similarly monitor received optical signals on its input ports and provide information back to the attached network equipment 1302. Preferably, the optical cross-connects 1300 only monitor the optical power of the received optical signals by tapping off a small percentage of the energy of the optical signal and use optical-to-electrical converters (OEs or O/Es) to determine the optical power without using O/E/Os.

FIG. 13 illustrates a block diagram of an out-of-band signaling interface between an optical cross-connect switch 1300 and attached network equipment 1302. The signaling interface is realized by using an out-of-band communication channel over a network 1304 which may also be referred to as an out-of-band signaling channel. In-band communication channels are those used by the optical cross-connect switch 1300 to switch data signals on the one or more data signals lines 1306A–1306N. An out-of-band communication channel is a communication channel other than that used by the optical cross-connect switch 1300 to switch its data signals on the data lines 1306A–1306N. The in-band communication channels used to switch data signals on the data lines 1306A–1306N by the optical cross-connect switch 1300 are light signals, also referred to as photonic signals or optical signals, that are carried in optical fibers. The data lines 1306A–1306N are not used for the signaling interface because these lines carry high-bandwidth signals. To convert optical signals in the optical domain into electrical signals in the electrical domain to extract signaling information is a very expensive process. Indeed, a major reason for using an all-optical cross-connect is to avoid converting signals from the optical domain to the electrical domain. The out-of-band signaling channel is provided on a network 1304 such as a LAN, a MAN, the internet or other WAN. Each of the data lines 1360A–1306N is bi-directional to provide duplex data communication channels. The data lines 1306A–1306N in one embodiment include at least two optical fibers for data flow in each direction between the optical cross-connect switch and the attached network equipment 1402 to provide full duplex data communication channels. In another embodiment, each of the data lines 1306A–1306N is a single optical fiber to provide bi-directional signal flow in both directions and can be full or half duplex data communication over a single optical fiber. Full duplex is accomplished over a single optical fiber by transmitting and detecting signals in the single optical fiber at each end. [NOTE—IS THIS CORRECT TO SAY FOR FULL DUPLEX OVER A SINGLE FIBER. WE HAVE BEEN TRYING TO MOVE TOWARDS SAYING "TRANSPORT" SO WHEN AN OPTICAL RECEIVE AND TRANSMITTER ARE NOT PROVIDED. PLEASE COMMENT. WEA] The network 1304 also provides a bi-directional out-of-band signaling channel so that signals can be received and transmitted in each direction between the optical cross-connect switch and the attached network equipment 1402 and other network equipment coupled to the network 1304. [IN THIS CASE IT SHOULD BE OK TO SAY TRANSMIT AND RECEIVE BECAUSE IT'S THE SINGALING INTERFACE. CORRECT?] The out-of-band signaling channel can be either full duplex or half duplex in providing bi-directional data communication.

Data signals from the optical cross-connect switch 1300 on the data lines 1306A–1306N are coupled into the attached network equipment 1302. The data lines 1306A–1306N are a light transmission media, such as optical fibers, coupled between the optical cross-connect switch 1300 and the attached network equipment 1302 to carry or transport the light pulses or photon pulses of the data signals there-between. That is, the attached network equipment 1302 is coupled or attached to the optical cross-connect switch 1300 to accept data signals transported over the one or more data lines 1306A–1306N. Data signals from the attached network equipment (ANE) 1302 on the data lines 1306A–1306N are coupled into the optical cross-connect switch 1300. The optical cross-connect switch 1300 is coupled or attached to the attached network equipment 1302 to accept data signals transported over the one or more data lines 1306A–1306N.

The optical cross-connect switch 1300 includes the network management controller (NMC) 1310 (also previously referred to herein as a network control module (NCM)), one or more I/O port cards 1314A–1314N and 1315A–1315N, and the optical switch fabric 1312. The optical switch fabric generates optical paths therein in order to cross-connect (also referred to as route or switch) optical signals from an I/O port card on the input side to an I/O port card on the output side. The optical paths are bi-directional in that the optical signal can flow in either direction with the optical path coupled to either an input port or an output port of a port card. I/O port cards can also be referred to as line cards, port cards, or I/O port modules as previously used herein. Each of the one or more I/O port cards 1314A–1314N and 1315A–1315N of the optical cross-connect switch 1300 includes an optical input port and an optical output port to couple to the optical fibers of the full duplex data lines 1306A–1306N. Port cards 1314 can also include some simple monitoring functions by tapping off a small percentage of the energy of the optical signal and converting it into an electrical signal using an inexpensive O/E. However, port cards 1314 do not need a full-fledged receiver for extensive monitoring of parameters such as a bit error rate or the presence of a particular frame because the signaling interface of the present invention is provided in order to acquire such information from other network equipment.

The attached network equipment 1302 includes a network management controller 1320 and one or more I/O port cards 1321A–1321N (also referred to as line cards or herein previously as I/O port modules). Each of the one or more I/O port cards 1321A–1321N includes an optical—electrical-optical converter 1322A–1322N on its data input ports to couple to optical fibers of the data lines 1306A–1306N. The one or more optical-electrical-optical converters 1322A–1322N first convert the optical signals on the data lines 1306A–1306N into electrical signals and then convert the electrical signals into optical signals.

The one or more optical-elctrical-optical converters 1322A–1322N can be used for a number of reasons including to generate electrical signals to monitor the optical signal as well as to amplify (i.e. regenerate) low level incoming optical signals. In the conversion process, the one or more optical—electrical-optical converters 1322A–1322N provide information regarding the optical signals in electrical form which is tapped for monitoring purposes as the electrical signals 1323A–1323N. The electrical signals 1323A–1323N may include information from other sources of the respective port card 1315A–1315N that may be of relevance to the optical cross-connect switch. The one or more optical—electrical-optical converters 1322A–1322N and their electrical signals were originally used in the attached network equipment 1302 to facilitate its functionality and monitor its performance and not provide feedback to an optical cross-connect switch.

The electrical signals 1323A–1323N are coupled into the network management controller (NMC) 1320 of the attached network equipment 1302. In one embodiment, the electrical signals 1323A–1323N, or a representation thereof, are signaled back to the optical cross-connect switch 1300 over the out-of-band signaling channel on the network 1304. The electrical signals 1323A–1323N, or a representation thereof, are transmitted from the network management controller 1320 in the attached network equipment 1302 to the network management controller 1310 in the optical cross-connect switch 1300. In this manner, the attached network equipment 1302 signals to the optical cross-connect switch 1300. In a similar manner with differing information, the optical cross-connect switch 1300 can signal to the attached network equipment 1302 over the out-of-band signaling channel.

The optical-electrical-optical converters 1322A–1322N are expensive and as a result of being already available in the attached network equipment 1302, they are not needed in the optical cross-connect switch 1300 if the signaling interface of the present invention is provided. This can provide considerable cost savings when purchasing optical cross-connect switches 1300.

In FIG. 13, the attached network equipment 1302 that is coupled to the optical cross-connect switch 1300 is a WDM line terminal 1302 which also includes a wave division multiplexer/demultiplexer 1324 along with the network management controller 1320 and the one or more port cards 1321A–1321N with the optical-electrical-optical converters 1322A–1322N. The wave division multiplexer/demultiplexer 1324 couples to a pair of optical fibers on one end to carry wave divisioned multiplexed signals 1326 in each direction for full duplex communication and one or more pairs of optical fibers on an opposite end to couple to the I/O port cards 1321A–1321N. The wave division multiplexer/demultiplexer 1324 multiplexes multiple light signals received from respective optical fibers in one direction into a wave division multiplexed signal 1326 having multiple light signals of different wavelengths carried over one optical fiber. The wave division multiplexer/demultiplexer 1324 demultiplexes a wave division multiplexed signal 1326 in an opposite direction having multiple light signals of different wavelengths carried over one optical fiber into multiple light signals for transmission to the optical cross-connect switch 1300 over the data lines 1306A–1306N. The wave division multiplexed signal 1326 provides greater data bandwidth and channel capacity over an optical fiber.

The network connection to the network 1304 for the out-of-band signaling channel is an Ethernet, an RS232 or other similar connection connecting together the network management controllers (NMCs) (also previously referred to as a network control module (NCM)) of the optical cross-connect switch 1300 and the attached network equipment 1302. Because the out-of-band signaling channel is provided over the network 1304, other network equipment or monitoring stations can receive information and transmit information or control signals over the out-of band signaling channel regarding the network, the network equipment and the optical network components connected to the network. Thus, management of the network can be facilitated regarding the optical cross-connect 1300, the attached network equipment 1302, and other network equipment using the out-of-band signaling channel. The out-of-band signaling channel over the network can be considered a centralized signaling interface.

Figure 14:
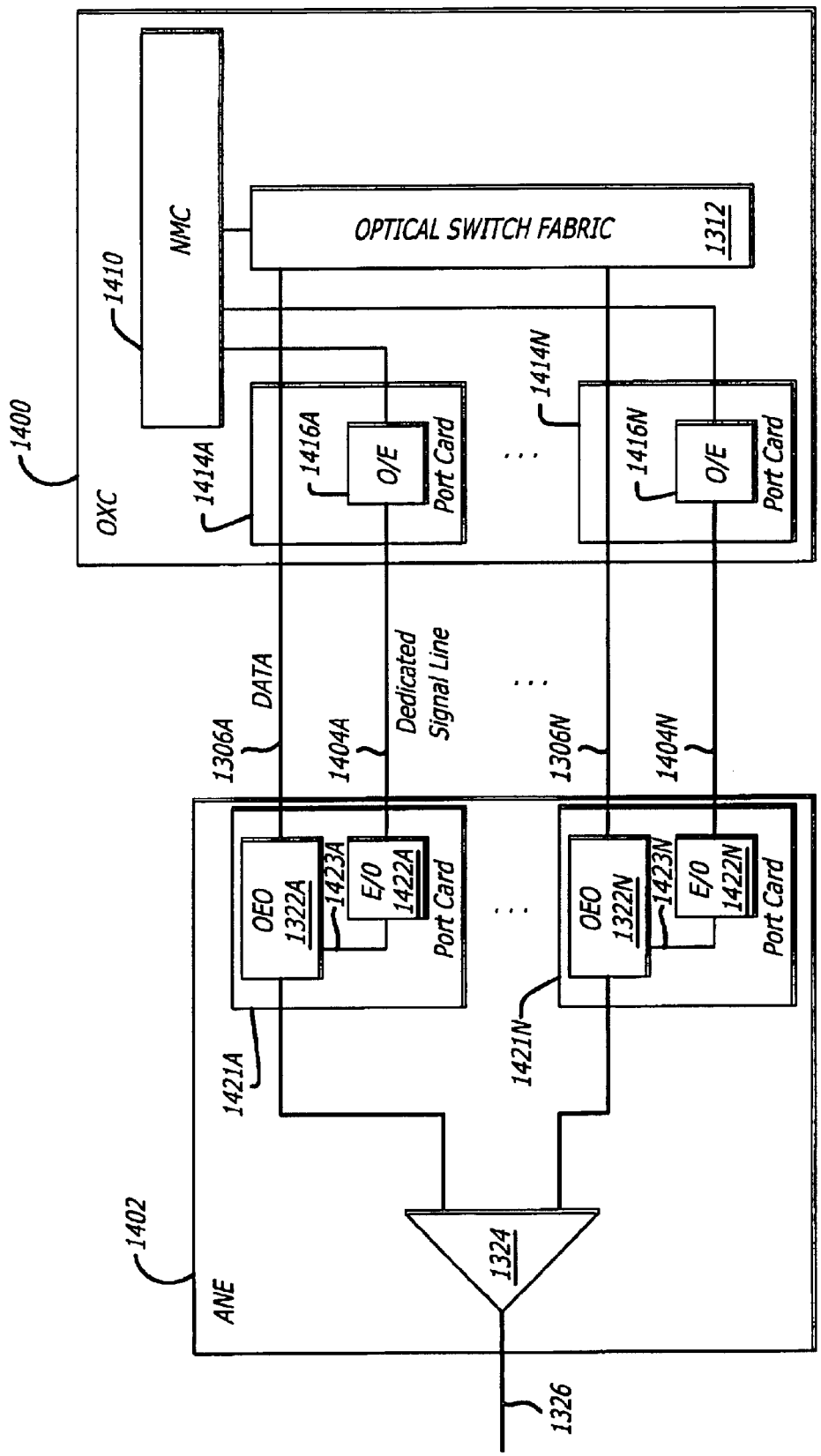
FIG. 14 is a block diagram illustrating a decentralized signaling interface between an optical cross-connect switch and attached network equipment.

Referring now to FIG. 14 a block diagram of a decentralized signaling interface between an optical cross-connect switch 1400 and attached network equipment 1402 is illustrated. The decentralized signaling interface is provided by one or more dedicated signal lines 1404A–1404N between the optical cross-connect switch 1400 and the attached network equipment 1402. The one or more dedicated signal lines 1404A–1404N can be formed by using low-cost multimode (MM) optical fibers or by using low cost electrical wire links.

The one or more dedicated signal lines 1404A–1404N replaces the out-of-band signaling channel of the network 1304. Whereas the out-of-band signaling channel of the network 1304 provided signals regarding switching each of the optical signals on multiple communication channels, one dedicated signal line 1404 provides information regarding switching of optical signals on one communication channel. Furthermore, the centralized signaling between the between the optical cross-connect switch 1400 and the attached network equipment 1402 was performed by the centralized NMCs 1310 and 1320 at a central control level. In contrast, decentralized signaling is performed by the I/O port cards (also referred to as line cards or herein previously as I/O port modules) at a line-card level which is a much lower level than the centralized NMC level.

In the embodiment illustrated in FIG. 14, the optical cross-connect switch 1400 includes the network management controller (NMC) 1310, one or more I/O port cards 1414A–1414N (also referred to as line cards, port cards and I/O port modules), and the optical switch fabric 1312. Each of the one or more I/O port cards 1414A–1414N and 1415A–1415N of the optical cross-connect switch 1400 includes an optical input port and an optical output port. Each of the one or more port cards 1414A–1414N further may include optical-electrical converters (O/E) 1416A–1416N if the dedicated signal line is an optical fiber. The optical-electrical converters 1416A–1416N of the optical cross-connect switch are much less expensive than optical-electrical-optical converters (O/E/O) that might otherwise be needed therein. Optical-electrical converters (O/E) are typically a fiber optic receiver module which includes a photodetector.

The attached network equipment 1402 includes one or more port cards 1421A–1421N (also referred to as line cards). Each of the one or more port cards 1321A–1321N includes an optical-electrical-optical converter 1322A–1322N on its data input ports to couple to optical fibers of the data lines 1306A–1306N. In the case the dedicated signal lines 1404A–1404N are optical fibers, each of the one or more port cards 1321A–1321N further includes an electrical-optical converter (E/O) 1422A–1422N to convert electrical signals 1423A–1423N into optical signals. Electrical-optical converters (E/O) are typically a fiber optic transmitter module which include a semiconductor laser with control electronics. Optical-electrical-optical converters (O/E/O) are typically a combination of an O/E converter coupled together with an E/O converter.

The attached network equipment 1402 that is illustrated coupled to the optical cross-connect switch 1400 is a WDM line terminal 1402. A WDM line terminal 1402 also includes a wave division multiplexer 1324 along with the one or more port cards 1421A–1421N with the optical—electrical-optical converters 1322A–1322N.

The one or more optical—electrical-optical converters 1322A–1322N first convert the optical signals on the data lines 1306A–1306N into electrical signals and then convert the electrical signals into optical signals. The one or more optical—electrical-optical converters 1322A–1322N are tapped to provide information regarding the optical signals in electrical form on the electrical signals 1323A–1323N. The port cards 1421A–1421N of the attached network equipment 1402 detect other relevant information and communicate it directly to the respective port cards 1414A–1414N of the optical cross-connect switch 1400 over the dedicated signal lines 1404A–1404N rather than signaling between the central NMCs 1310 and 1320. Similarly, port cards 1414A–1414N of the optical cross-connect switch 1400 can detect relevant information and communicate it directly to the respective port cards 1421A–1421N of the attached network equipment 1402 over the dedicated signal lines 1404A–1404N.

Having established a signaling interface, it can be used for several purposes. The signaling interface can be used to enable fast network restoration through the optical cross-connect switch (OXC) in the event of network failures. Network failures include signal failures such as a loss of signal (LOS) or signal degradation such as through a bit error rate (BER) or other commonly know optical failure mechanisms. Attached network equipment (ANE) can detect failures in real time by using its O/E/Os and convey this information to the optical cross-connect switch over the signaling interface so that it can perform network restoration. The optical cross-connect switch is typically without O/E/Os and may not be able to detect the failure due to the otherwise relatively simple monitoring usually found within an optical cross-connect switch.

Another use for the signaling interface is to allow attached network equipment (ANE) to control the optical cross-connect switch (OXC). For example, the attached network equipment (ANE) could signal to the OXC over the signaling interface in order for it to provide a particular switch configuration.

Another use for the signaling interface is so that the optical cross-connect switch can signal to the attached network equipment to set specific parameters therein. For example during setting up a connection, the optical cross-connect switch may ask the attached equipment to adjust its transmitter power level.

Another use for the signaling interface is to allow attached network equipment (ANE) to request a connection through the optical cross-connect switch (OXC). The optical cross-connect switch (OXC) sets up the connection and informs the attached network equipment (ANE) when its available.

Another use for the signaling interface is to perform protection switching between the OXC and the attached network equipment. For example, the signaling interface could be provided by one spare fiber facility for N working facilities between the attached equipment and the OXC. If one of these N facilities fails, the signaling channel is used by both devices to switch connections from the failed facility to the spare facility.

VI. Optical to Electrical to Optical Conversion

Specific configurations for building optical cross-connect switching systems are disclosed herein. Optical-to-electrical-to-optical converters (O/E/Os) are included on input and output ports to an optical switch fabric, a core element of an optical cross-connect. Methods for performing bridging, test access, and supporting redundant cores are also disclosed.

Figure 15:
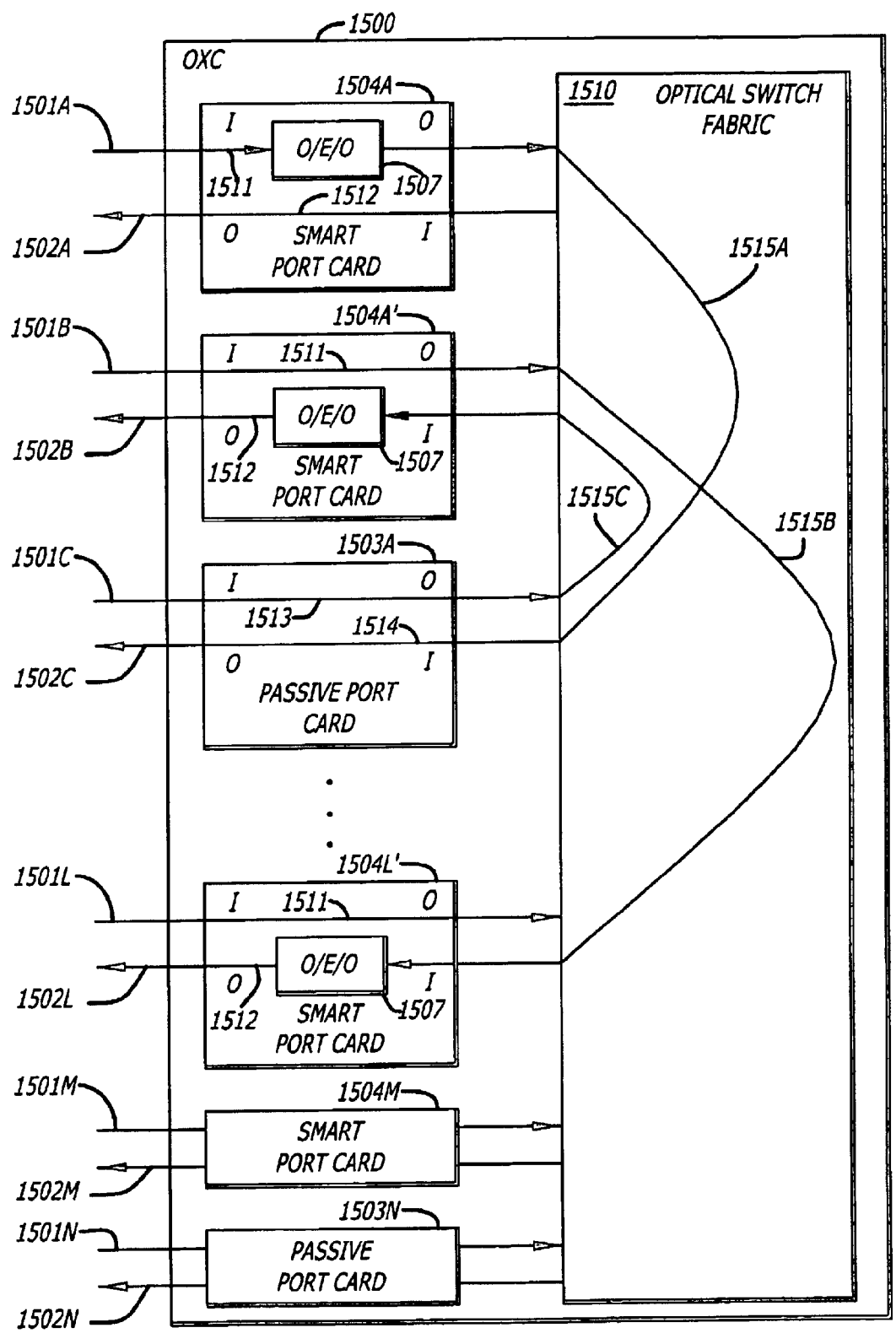
FIG. 15 is a block diagram of an optical cross-connect switch having various port cards including passive port cards and smart port cards having optical-electrical-optical converters.

Referring now to FIG. 15, a block diagram of an optical cross-connect switch (OXC) 1500 is illustrated. An optical cross-connect switch is also referred to herein as an optical cross-connect, an OXC, and an optical cross-connect switching system. The optical cross-connect switch (OXC) 1500 includes an optical switch fabric 1510 (also referred to as the optical switch core) and various I/O port cards. The optical cross-connect switch 1500 has one or more optical input ports 1501A–1501N and one or more optical output ports 1502A–1502N provided by various I/O port cards which are also referred to herein as I/O port modules or simply port cards. The various I/O port cards can include one or more smart port cards 1504A–1504L and 1504A'–1504M' (generally referred to as smart port cards 1504) and/or one or more passive port cards 1503A–1503N (generally referred to as passive port cards 1503). The optical switch fabric 1510 in one embodiment is an N×N optical switch core having N inputs and N outputs. The optical switch fabric generates optical paths therein in order to cross-connect (also referred to as route or switch) optical signals from an input side to an output side. The optical paths are bi-directional in that the optical signal can flow in either direction with the optical path coupled to either an input port or an output port of a port card. Each input and output port and each input and output of the optical switch core is respectively associated with an input and output path of one of the one or more port cards 1504 and 1503. The input path and the output path are paths over which the optical signals propagate in the port card relative to the optical switch fabric 1510.

The port cards 1504 and 1503 can be classified as either passive port cards or as smart port cards. The one or more smart port cards include optical-electrical-optical converters (O/E/O) 1507 in an optical input path, an optical output path, or both their optical input and output paths. Optical-electrical-optical converters are also referred to herein as optical-to-electrical-to optical converters. The O/E/Os 1507 are provided in an optical cross-connect switch for several reasons. The O/E/Os provide a standardized interface with other equipment; enable an optical cross-connect switch to perform detailed real-time performance monitoring, such as bit error rates, and to determine failures in the network using this monitoring; can isolate one segment of the network from another segment; and can provide wavelength conversion. The one or more passive port cards 1503 do not have an optical-electrical-optical converter (O/E/O) 1507 to provide optical-electrical-optical conversion in either of their optical input paths 1513 or optical output paths 1514.

The smart port cards 1504A–1504M have an O/E/O 1507 in their optical input paths 1511 and not their optical output paths 1512. The O/E/O 1507 in the optical input paths 1511 is also referred to being on the input side of the optical cross-connect switch 1500. Locating an O/E/O on the input isolates the optical losses associated with an optical cross-connect switch from the input optical signal. Additionally, an O/E/O on the input side can regenerate an input optical signal and provide a stronger optical signal for propagation through a switch fabric of an optical cross-connect switch. An O/E/O on the input side of an optical cross-connect switch (OXC) can also provide wavelength conversion and/or translation before the signal is routed through the switch fabric of the optical cross-connect switch. That is, the O/E (optical receiver) of the O/E/O can accept a full range of photon frequencies and convert it into an electrical signal while the E/O conversion may be provided by a multimode laser for example that can be tuned to a desired photon wavelength (i.e. frequency) output to provide wavelength conversion. Otherwise, the E/O conversion may be provided by a single mode laser for example which has the desired photon wavelength output as opposed to be tunable. Additionally, the O/E/O on the input side can generate an electrical signal representing the incoming optical signals for monitoring purposes. A processor can process the electrical form of the incoming optical signals in a binary coded form to make control decisions as well as pass performance information to other network equipment regarding the input optical signals input. For example, the electrical signal may indicate the lack of an optical signal or errors in an optical signal.

The smart port cards 1504A'–1504L' have an O/E/O 1507 in their optical output paths 1512 and not their optical input paths 1511. The O/E/O 1507 in the optical output paths 1512 is also referred to as being on the output side of the optical cross-connect switch 1500. Locating an O/E/O on the output path isolates the optical cross-connect switch from the network to which it is attached. For example negative optical conditions or negative timing parameters may exist on the cross connected signal output from the switch fabric, such as low optical power, wrong wavelength, poor spectral quality, overpower, etc. The O/E/O within the output path can isolate these conditions from the optical network. Additionally, an O/E/O on the output side can regenerate an the optical signal output from the switch fabric and provide a stronger optical signal at the output of an optical cross-connect switch. An O/E/O on the output side of an optical cross-connect switch (OXC) can also provide wavelength conversion and/or translation after the signal has been routed through the switch fabric of the optical cross-connect switch. The optical signals that are input into the optical cross-connect switch may have a wide range of wavelengths and the O/E/O can convert them into one or more desired wavelengths as the output optical signal. Additionally, the O/E/O on the output side can generate an electrical signal representing the outgoing optical signals from the optical cross-connect switch. A processor can process the electrical form of the outgoing optical signals in a binary coded form to make control decisions as well as pass performance information to other network equipment regarding the output optical signals. For example, the electrical signal may indicate the lack of an optical signal and a failure in the optical cross-connect switch or errors in an optical signal.

In any case, the smart port cards 1504 converts the optical signal in the optical path into an electrical form, process the electrical signal if desired, generate a desired optical signal from the electrical signal, and retransmit the optical signal over the respective optical input or output path in optical form.

An optical-electrical-optical converter 1507 first converts an input optical signal into an electrical signal. The electrical signal can be tapped out to provide information regarding the input optical signal input into the O/E/O 1507 the O/E/O 1507 then converts the electrical signal into an output optical signal. The output optical signal from the O/E/O is similar to the input optical signal into the O/E/O in that the same data is being carried but the optical signal amplitude may be amplified, wavelength converted or otherwise improved in some way over that of the input optical signal. The O/E/O 1507 provides the conversion with little delay in the data carried by the optical signal.

While an O/E/O 1507 may be in both the optical input path of a smart port card (input side of OXC) and the output path of a smart port card (output side of OXC), it is required only in one of the optical paths of one port card for the more sophisticated applications of the optical cross-connect switches. Smart port cards 1504 in FIG. 15 of the optical cross-connect switch 1500 illustrate this principle. For example, an optical path 1515A in the optical switch fabric 1510 couples the optical input path 1511 of the smart port card 1504A with the optical output path 1514 in the passive port card 1503A. The optical signal is regenerated by the O/E/O 1507 in the optical input path 1511 of the smart port card 1504A. As another example, an optical path 1515B in the optical switch fabric 1510 couples the optical input path 1511 of the smart port card 1504B to the optical output path 1512 of the smart port card 1504N. In this example, the optical signals are monitored by the O/E/O 1507 in the optical output path 1512 of the smart port card 1504N. As yet another example, an optical path 1515C in the optical switch fabric 1510 couples the optical input path 1513 of the passive port card 1503A with the optical output path 1512 of the smart port card 1504B. In this example, the optical signals are regenerated by the O/E/O 1507 in the optical output path 1512 of the smart port card 1504B. Because the O/E/O 1507 is rather expensive, using only one O/E/O 1507 in a smart port card 1504 saves significant costs.

The type of port card to use, smart or passive, depends on the application of the optical cross-connect 1500 in the communication network. For a simple provisioning application where the optical cross-connect switch 1500 is used to set up optical connections, passive port cards 1503 need only be utilized. For a more sophisticated application where full-featured performance, fault management and optical protection are desired, smart port cards 1504 are needed. Note that a mixture can be used where some of the port cards in the optical cross-connect 1500 are passive port cards 1503 and others are smart port cards 1504 such as that illustrated in FIG. 15.

Figure 16:
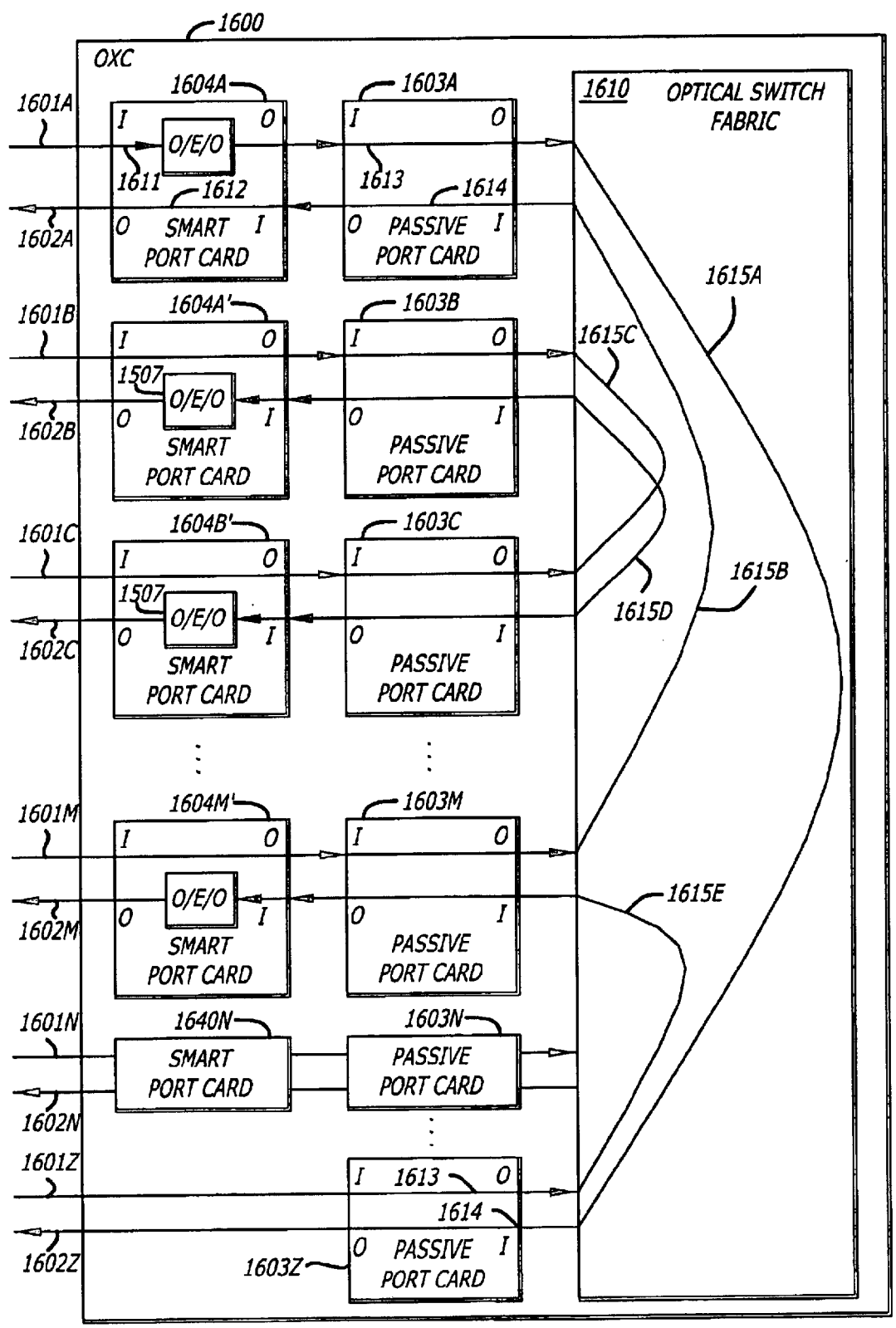
FIG. 16 is a block diagram of an optical cross-connect switch having a one and two tiered port card arrangement with smart port cards having optical-electrical-optical converters coupled to passive port cards.

Referring now to FIG. 16, a block diagram of an optical cross-connect switch 1600 having a one and two tiered port card arrangement is illustrated. The optical cross-connect 1600 has one or more optical input ports 1601A–1601Z and one or more optical output ports 1602A–1602Z provided by the various port cards. In the two tiered port card arrangement of the optical cross-connect 1600, one or more smart port cards 1604A–1604M and 1604A'–1604N' (generally referred to as 1604) are coupled to one or more passive port cards 1603A–1603N (generally referred to as 1603) to access the optical switch fabric 1610 (also referred to as an optical switch core). That is, the optical input paths of the smart port cards are coupled to the optical input paths of the passive port cards and the optical output paths of the passive port cards are coupled to the optical output paths of the smart port cards. Thus, input optical signals on the optical input paths of the smart port cards are coupled into the optical input paths of the passive port cards. Output optical signals on the optical output paths of the passive port cards are coupled into the optical output paths of the smart port cards in the two tiered port card arrangement. Note that an optical signal may or may not need to be passed through a smart port card before being passed through a passive port card. The passive port card 1603Z illustrates this case. Thus, passive port cards alone as a single tiered port card arrangement can be intermixed within the two tiered port card arrangements.

In either the single or two tiered port card arrangement in the optical cross-connect switch 1600, only the passive port cards 1603A–1603Z are used to access the optical switch fabric 1610. The optical signals on the optical input path 1613 and the optical output path 1614 of the passive port card 1603Z need to couple to an optical output path 1612 and an optical input path 1611 respectively each having an O/E/O 1507 in order to regenerate the optical signals. Exemplary switching of optical signals is illustrated in FIG. 16 by the optical paths 1615A–1615E in the optical switch fabric 1610. Unidirectional and bi-directional connections can be made through the optical cross-connect switch between I/O port cards. Bi-directional connections are more typically the case. The optical paths 1615A, 1615B and 1615E illustrate exemplary optical paths (also referred to as light paths) through the optical switch fabric 1610 for unidirectional connections between I/O port cards. The optical paths 1615C and 1615D illustrate exemplary optical paths through the optical switch fabric 1610 for bi-directional connections between I/O port cards. The settings of the optical switch fabric 1610 change in order to rearrange the optical paths between the I/O port cards as desired.

The passive port cards 1603A–1603Z in the optical cross-connect 1600 provide control of the optical signals into and out of the optical switch fabric 1610. The smart port cards 1602A–1602M having the O/E/Os 1507 provide regeneration, performance monitoring, fault management and protection switching functions. By splitting the functionality of the port cards in this manner into the two tiered arrangement, replacement of faulty port cards can be less costly. The two tiered arrangement of I/O port cards also allows a system to be deployed with passive port cards initially with smart port cards being added later as needed. Also the smart port cards typically have different power and cooling requirements than the passive port cards, and may be located in separate shelves to provide additional cooling.

In addition to basic switching functions provided by an optical cross-connect, it is desirable to provide bridging, test access and support for redundant optical switch fabrics (also referred to as redundant optical switch cores).

Figure 17:
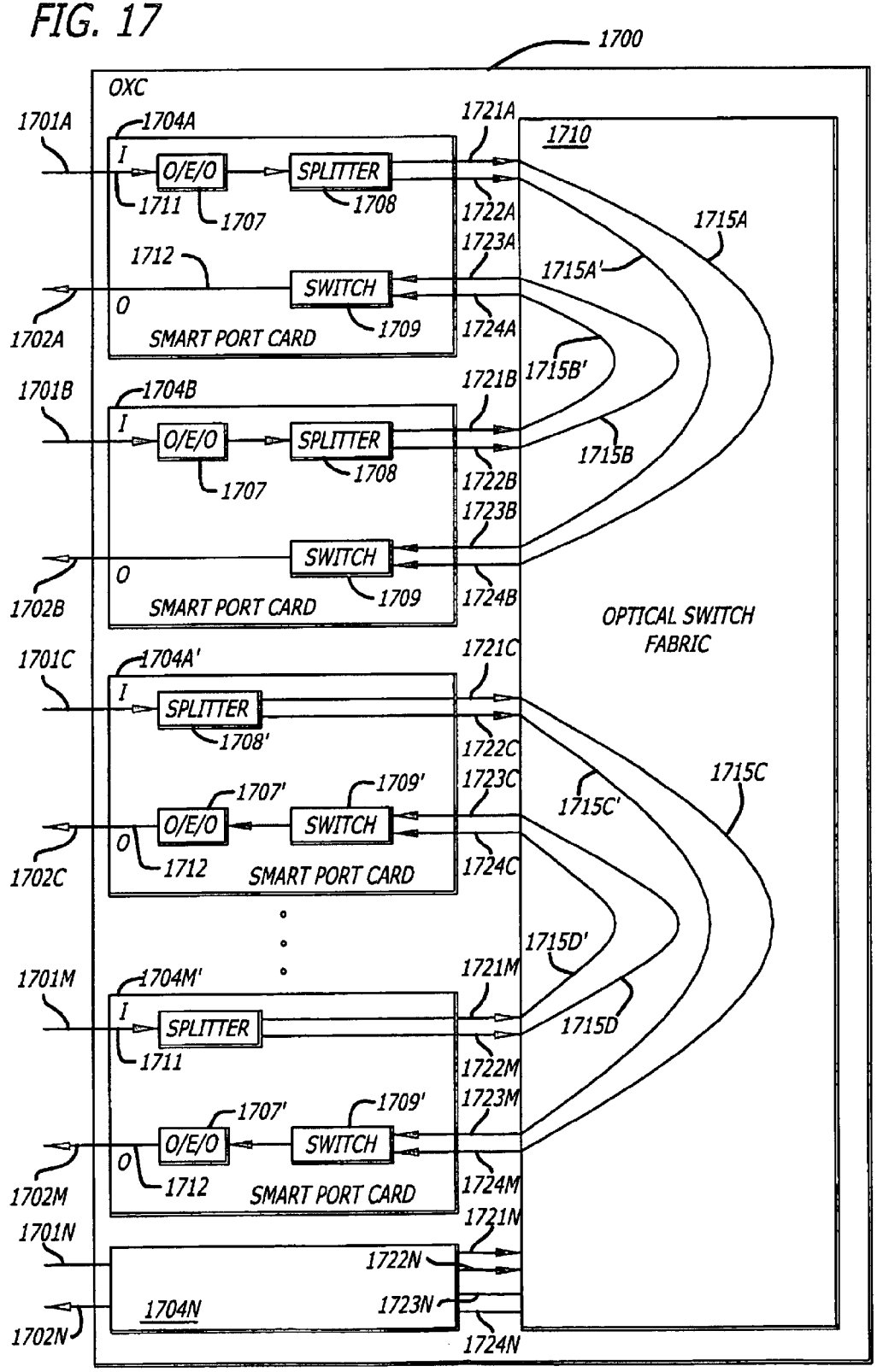
FIG. 17 is a block diagram of an optical cross-connect switch including port cards providing bridging in an optical switch fabric.

Referring now to FIG. 17, a block diagram of an optical cross-connect 1700 is illustrated. The optical cross-connect 1700 has one or more optical input ports 1701A–1701N and one or more optical output ports 1702A–1702N provided by the various port cards. The optical cross-connect 1700 includes smart port cards 1704A–1704N and 1704A'–1704M' that provide bridging for the optical switch fabric 1710. Bridging means that at least two optical paths are provided between port cards carrying the same optical signals. The optical switch fabric 1710 illustrates exemplary optical signal paths 1715A–1715D and redundant optical signal paths 1715A'–1715D'. If one optical path fails in the optical switch fabric 1710, the redundant optical path in the optical switch fabric 1710 continues to handle the data carried by the optical signals. For example, if the optical path 1715A fails in the optical switch fabric 1710, the optical path 1715A' continues to carry the optical signals. The redundant optical path 1715A' can be thought as bridging a gap in the optical path 1715A when it fails.

An optical path or the generation of optical signals in an optical path can fail terminating the optical signal completely or generating bit errors at a high rate over that of the other optical signal or optical path. By monitoring the optical signal inputs and/or outputs from the optical network equipment such as the optical cross-connect switch, a determination can be made whether to switch from one optical signal in one optical path to another. The optical path and or optical signal in the optical path can fail for a variety of reasons including one or more faulty components or a failure in control.

To generate a redundant optical path in the optical cross-connect switch 1700, an input optical signal is input into an input port such as input port 1701A. In one type of smart port card, illustrated by smart port cards 1704A–1704N (generally referred to as 1704), the input optical signal is coupled into an O/E/O 1707 in the input path 1711. The O/E/O 1701 converts the optical signal into an electrical signal which is then converted back into an optical signal. The electrical signal is used to monitor the input optical signals. The O/E/O 1707 is coupled to an optical splitter 1708 to split the incoming optical signal into at least two optical signals on at least two split optical paths 1721A and 1722A. The splitter 1708 can be used to split the incoming optical signal into more than two split optical paths to provide greater redundancy and reliability if desired but is typically not needed. The optical splitter 1708 in one embodiment is a passive optical coupler. While the data signal or pulses of light of the split optical signals are the same, the energy level of the incoming optical signal can be split equally or unequally into the at least two optical signals on the at least two split optical paths 1721A and 1722A. The at least two split optical paths are coupled into the optical switch fabric 1710 and switched to another port card respectively over the optical paths 1715A and 1715A' for example. The redundant optical signals in the optical paths 1715A and 1715A' are coupled into a switch 1709 of the smart card 1704B for example over the split paths 1723B and 1724B respectively. The switch 1709 is an optical switch. As its output, the switch 1709 selects between the at least two optical signals in the at least two split optical paths 1715A and 1715A'. The selected output of the optical switch 1709 is coupled into the optical output path 1712 of the smart port card and the output port 1702B of the optical cross-connect switch 1700. In the case that one of the two optical signals in the at least two split optical paths fails or has errors, the optical switch 1709 can select the alternate optical path as its output to overcome the path failure or the errors.

In another type of smart port card, illustrated by smart port cards 1704A'–1704M' (generally referred to as 1704'), an input optical signal at the input port is first coupled into a splitter 1708' in the optical input path 1711. The incoming optical signal is first split by the splitter 1708' into at least two optical signals on at least two split optical paths 1721C and 1722C for example. The at least two optical signals on the at least two split optical paths 1721C and 1722C are then coupled into the optical switch fabric 1710 for switching. In the optical switch fabric 1710, the split optical signals are routed over different optical paths such as optical paths 1715C and 1715C'. The split optical signals on the different optical paths are coupled into the same switch of a port card such as switch 1709' of the smart port card 1704M' via the optical paths 1723M and 1724M for example. The switch 1709' is an optical switch. As its output, the switch 1709' selects between the at least two optical signals in the at least two split optical paths 1715C and 1715C' for example. The selected output of the optical switch 1709' is coupled into the optical output path 1712 of the smart port card and the output port 1702M of the optical cross-connect switch 1700. In the case that one of the two optical signals in the at least two split optical paths fails or has errors, the optical switch 1709' can select the alternate optical path as its output to overcome the path failure or the errors. The output of the optical switch is coupled into the O/E/O 1707' on the smart port card for regenerating the optical signals. With the O/E/O 1707' in the output path, regeneration is performed post split. In this manner, the O/E/Os do not need to be duplicated in the input path and output path for each connection of a communication channel over the optical cross-connect switch 1700. The monitoring provided by the O/E/Os 1707 and 1707' in the smart port cards in the optical cross-connect switch 1700, assist in the selection between the at least two optical signal in the at least two split optical paths by the optical switches 1709 and 1709' respectively. If the monitoring determines that there is no signal at the output of the optical switch 1709' and its known that there should be a signal present, the optical switch 1709' can select the alternate path. If the monitoring determines that there is an input optical signal into the splitter 1708 and its known that it should be present at the output of a switch 1709, the alternate path can be selected.

In either case, the port cards of the optical cross-connect switch 1700 of FIG. 17 split the incoming optical signal at an input port into at least two split optical signals to propagate over two different optical paths and provide redundancy in how the data signal is routed over the optical switch fabric. The port cards then select which of the at least two split optical signals to couple into an output port of the optical cross-connect.

Figure 18:
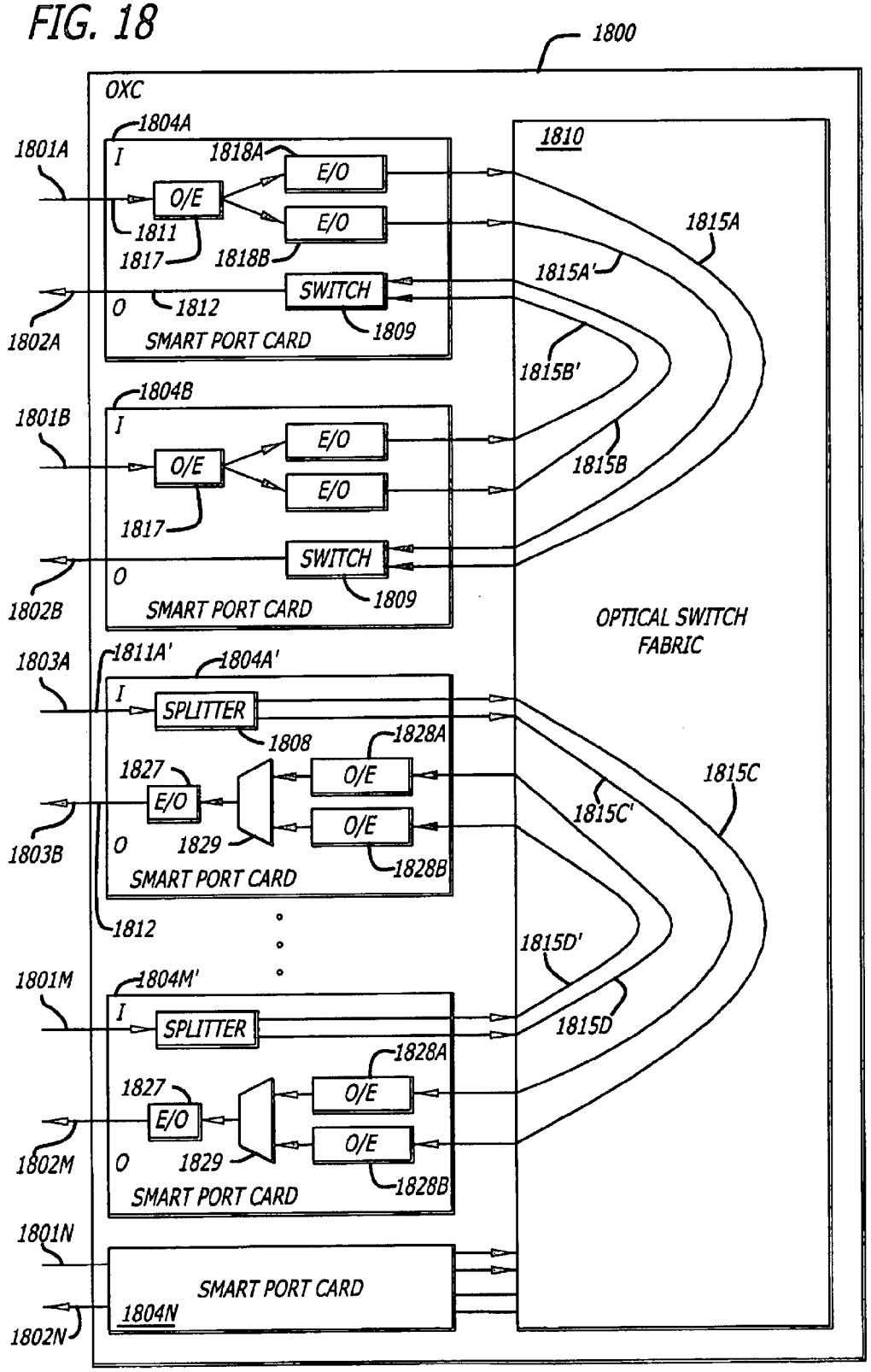
FIG. 18 is a block diagram of an alternate optical cross-connect including port cards providing bridging in an optical switch fabric.

Referring now to FIG. 18, a block diagram of an optical cross-connect switch 1800 is illustrated. The optical cross-connect switch 1800 is an alternate embodiment to provide bridging over an optical switch fabric 1810. The optical cross-connect switch 1800 has one or more optical input ports 1801A–1801N and one or more optical output ports 1802A–1802N provided by the various port cards.

Using one type of smart port card, the incoming optical signal is first converted from an optical signal in the optical domain into an electrical signal in the electrical domain and fanned out (i.e. electrically split into two equal electrical signals) by coupling into to two optical transmitters (i.e. an electrical to optical converter such as a semiconductor laser). The two optical transmitters convert in parallel the electrical signal into two optical signals in the optical domain. The two optical signals generated by the two optical transmitters (electrical-optical converters) are substantially similar. The two optical signals are then routed through the optical switch fabric through differing optical paths. A selection is then made at the output of the optical switch fabric between the two optical signals in order to generate the output optical signal from the optical cross-connect. If one path of the two optical signals should fail, the opposite path is selected.

Using another type of smart port card, the incoming optical signal is optically split into two split optical signals which are routed over the optical switch fabric. At the output of the optical switch fabric, the two split optical signals in the optical domain are coupled into two optical receivers (each an optical to electrical converter (O/E) such as a photodiode) to convert them into two electrical signals respectively in the electrical domain. The two electrical signals are then coupled into multiplexer to electronically select which one of the two should be transmitted out the output port of the optical cross-connect by an optical transmitter (i.e. an electrical to optical converter such as a semiconductor laser). The optical transmitter converts the selected electrical signal in the electrical domain into an optical signal in the optical domain.

Referring to FIG. 18, the optical cross-connect switch 1800 can include one or more smart port cards 1804A–1804N and/or one or more smart port cards 1804A'–1804M'. In either case, the smart port cards provide two different optical paths through the optical switch fabric 1801 for the same communication channel connection. For example, optical paths 1815A–1815D are one path for the communication channels while optical paths 1815A'–1815D' are another both carrying the same data signals. If one optical path should fail generating a gap in the connection, the other path is selected to bridge the gap and to allow a continuous flow of data for the given communication channel connection. Bridging in this manner increases the reliability of the optical cross-connect.

The smart port cards 1804A–1804N include an optical receiver 1817 (i.e. an optical to electrical converter (O/E) such as a photodiode) which is coupled to a pair of optical transmitters 1818A and 1818B (i.e. an electrical to optical converter (E/O) such as a semiconductor laser) in the input path 1811. Thus, in the input path 1811 of the smart port cards 1804A–1804N an optical-electrical-optical conversion (O/E/O)is performed. In the output path 1812, the smart port cards 1804A–1804N include an optical switch 1809 to select between two optical signals. The optical transmitters 1818A and 1818B generate the two parallel optical signals that are routed over two paths in the optical switch fabric such as optical paths 1815A and 1815A'. The optical switch 1809 selects between the two parallel optical signals to generate one as the output of the optical cross-connect 1800 on an output port. If the selected path should fail, the optical cross-connect switches to the other optical signal carried over the other optical signal path.

The smart port cards 1804A'–1804M' include an optical splitter 1808 in the input path 1811 to split the incoming optical signal into two split optical signals. The two split optical signals are coupled into the optical switch fabric 1810 to be routed over two separate optical paths. For example, the smart port card 1804A' would couple a split incoming optical signal into the optical paths 1815C and 1815C' of the optical switch fabric. In the output path 1812, the smart port cards 1804A'–1804M' include a pair of optical receivers 1828A and 1828B, a multiplexer 1829, and an optical transmitter 1827. The pair of optical receivers 1828A and 1828B (i.e. an optical to electrical converter (O/E) such as a photo-diode) receive the split optical signals routed over the two separate optical paths. A benefit of locating these receivers after the switch fabric(s) is that they can accept a full range of wavelengths of photons due to dense wavelength division multiplexed (DWDM) optical signals. The wide range of wavelengths of optical signals over the optical paths in the optical cross-connect can exist due to DWDM. Being able to cross-connect any optical signal to the O/E/O over a range of wavelengths is desirable to provide wavelength conversion/translation in the optical cross-connect switch. Another benefit is that if some negative optical conditions or negative timing parameters exist in the cross connected optical signal from the switch fabric, such as low optical power, wrong wavelength, poor spectral quality, overpower, etc. within the cross-connect switch, it can be isolated by the O/E/O before being output to the network. The split optical signals are converted into two electrical signals by the optical receivers 1828A and 1828B and coupled into the multiplexer 1829. The two electrical signals can also be monitored locally to determine which should be selected to generate the optical output signal. It can also be forced to switch by means of external communication control, if external monitoring methods are employed. The multiplexer 1829 electronically selects one of the two electrical signals to be coupled into the optical transmitter 1827 (an electrical to optical converter (E/O) such as a semiconductor laser). If the two signals being selected from have the same data and protocol, as expected, it is envisioned that the monitored switching between the two within the multiplexer could be hitless, i.e. produce no errors on the selected electrical signal. This behavior is very beneficial to bridge and roll applications and those that have Forward-Error-Correction data encoding schemes. This would also apply to SONET and SONET like data streams as well as those employing a 'wave wrapper' protocol. The optical transmitter 1827 converts the selected electrical signal in the electrical domain into an optical signal in the optical domain for transmission out over the output port of the optical cross-connect 1800. Thus, in the output path 1812 of the smart port cards 1804A'–1804M' an optical-electrical-optical conversion (O/E/O) is performed.

Bridging in this manner provides that if a path or a component in the path fails, the other path and components can handle the data flow over the communication channel in the optical cross-connect. A disadvantage to the bridging provided by the optical cross-connects 1700 and 1800 is that fewer communication channels can be supported because of the redundant optical paths formed in the optical switch fabrics 1710 and 1810 respectively. One way to alleviate this problem is to use a redundant optical switch fabric to provide the redundant path.

Referring now to FIGS. 19A–19G, block diagrams of embodiments of optical cross-connect switches 1900A–1900G are illustrated. The optical cross-connect switches 1900A–1900G include port cards that provide bridging by using two or dual optical switch fabrics (also referred to as optical switch cores). The incoming signal is split into at least two signals with one portion being coupled into one optical switch fabric with another portion of the signal being coupled into the other optical switch fabric. While one acts as an active optical switch fabric, the other acts as a redundant optical switch fabric, for each path through the system. Providing a redundant optical switch fabric also provides reliability in case there is a problem in control of one of the optical switch fabrics. Furthermore, the redundant optical switch fabric provides hot swapability in that while one is having its optical switch fabric or other control systems updated or replaced, the other can continue to provide optical switching. The optical cross-connect switches 1900A–1900G also includes a test access/monitor port card to test and monitor the optical paths through the two optical switch fabrics to determine if there is a failure mechanism or not.

Figure 19A:
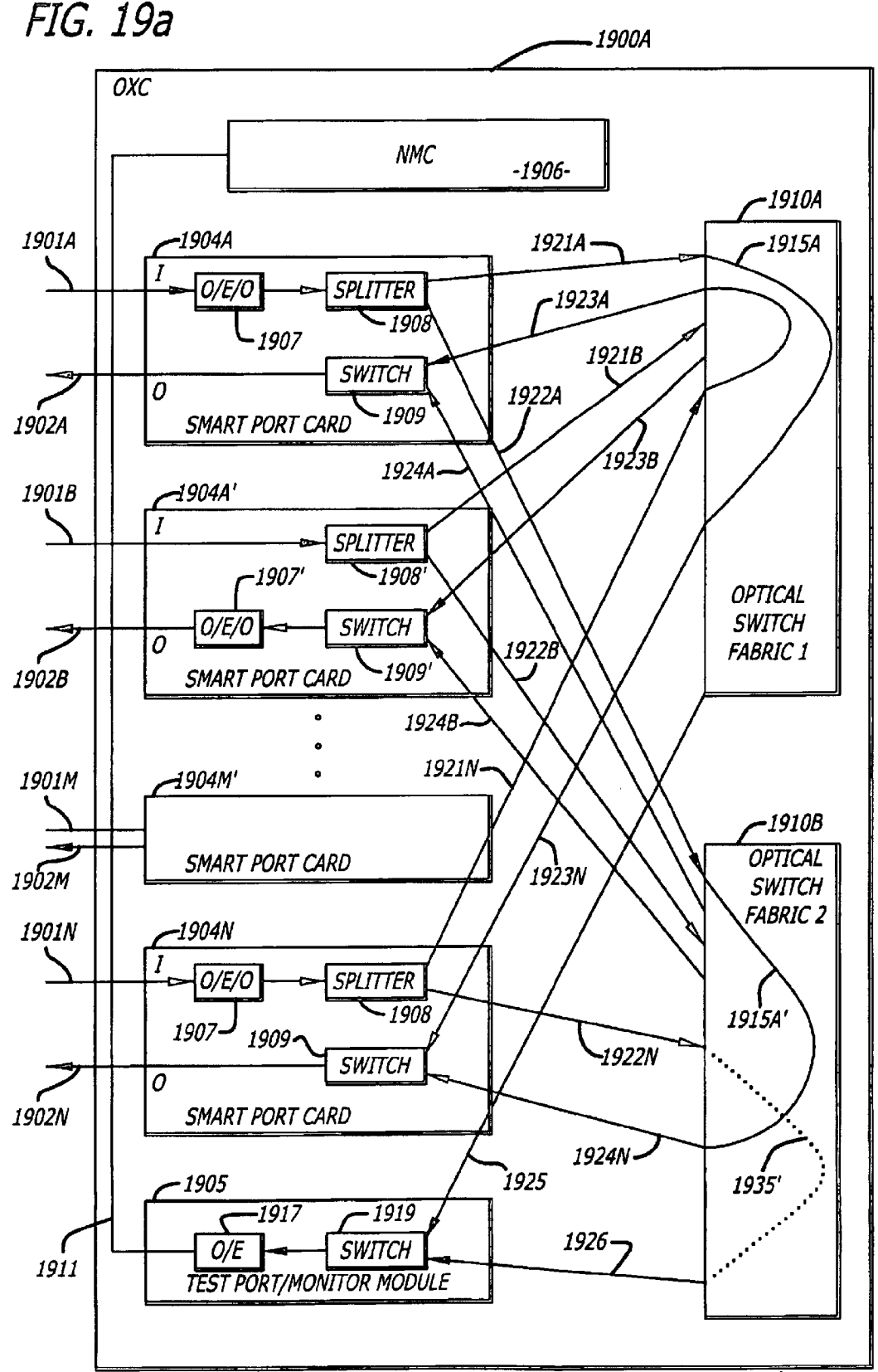
FIGS. 19A–19G are block diagrams of an optical cross-connect switch including smart port cards and/or passive port cards to provide bridging using a redundant optical switch fabric and testing/monitoring using a test port/monitoring card.

Referring to FIG. 19A, the optical cross-connect 1900A includes a first optical switch fabric 1910A and a second optical switch fabric 1910B and has one or more optical input ports 1901A–1901N and one or more optical output ports 1902A–1902N provided by the various port cards. The optical cross-connect 1900 also includes one or more smart port cards 1904A–1904N (generally referred to as 1904) and/or one or more smart port cards 1904A'–1904M' (generally referred to as 1904'). The optical cross-connect 1900 can also include one or more test port/monitor cards 1905. The smart port cards 1904A–1904N provide an O/E/O 1907 in their input paths while the smart port cards 1904A'–1904M' provide an O/E/O 1907' in their output paths. The smart port cards 1904A–1904N and 1904A'–1904M' each have an optical splitter 1908 and 1908' respectively in their input paths. The smart port cards 1904A–1904N and 1904A'–1904M' each have an optical switch 1909 and 1909' respectively in their output paths. The O/E/Os 1907 and 1907', optical switches 1909 and 1909', and the optical splitters 1908 and 1908' are optically coupled together within the smart port cards 1904A–1904N and 1904A'–1904M' as shown and illustrated in FIGS. 19A and 19B. In either type of smart port cards 1904 or 1904', the optical splitter 1908 or 1908' splits the incoming optical signal into two split optical signals over two different optical paths one of which is coupled into the first optical switch fabric 1910A and the other which is coupled into the second optical switch fabric 1910B. In either type of smart port cards 1904 or 1904', the optical switch 1909 and 1909' selects an optical signal from between two optical signals over two differing optical signal paths one of which is received from the first optical switch fabric 19010A and the other of which is received from the second optical switch fabric 1910B. In this manner should an optical signal path in one of the two switch fabrics fail for any reason, the optical switch 1909 or 1909' only need select the opposite signal path, For example consider the exemplary optical path 1915A in the optical switch fabric 1910A and the optical path 1915A' in the optical switch fabric 19101B. Splitter 1908 in the smart port card 1904A splits an incoming optical signal into two split optical signals on optical paths 1921A and 1922A. The signal on the optical path 1921A is coupled into the first optical switch fabric 1910A and the signal on the optical path 1922A is coupled into the second optical switch fabric 1910B. The optical switches 1910A and 1910B switch these optical signals into the exemplary optical signal paths 1915A and 1915A' respectively. The optical signal path 1915A in the optical switch fabric 1910A is coupled into the optical path 1923N which is coupled into the optical switch 1909' of the smart port card 1904N. The optical signal path 1915A' in the optical switch fabric 19101B is coupled into the optical path 1924N which is coupled into the optical switch 1909' of the smart port card 1904N. In one case, the optical switch 1909' of the smart port card 1904N selects the optical signals over the optical path 1915A so that the first optical switch fabric 1910A is acting as the active optical switch fabric. In another case, the optical switch 1909' of the smart port card 1904N selects the optical signals over the optical path 1915A' so that the second optical switch fabric 1910B is acting as the active optical switch fabric. If either optical switch fabric fails generating a gap, the other is automatically selected by the smart port cards to bridge the gap.

In this case, optical signals from the smart port card 1904A are coupled into the smart port card 1904N such that only one O/E/O 1907 is needed to regenerate the optical signals input into the optical cross-connect 1900. If it is desirable to regenerate optical signals into as well as out of the optical cross-connect 1900, optical signals from one of the smart port cards 1904A–1904N can be coupled into one of the smart port cards 1904A'–1094M' which have an O/E/O 1907' to regenerate the output optical signals in the output path.

Other port cards including passive port cards can be used with more than one optical switch fabric to provide at least one redundant optical switch fabric. FIGS. 19B–19G illustrate exemplary embodiments of other combinations of port cards that can be used with the two optical switch fabrics 1910A and 1910B.

Figure 19B:
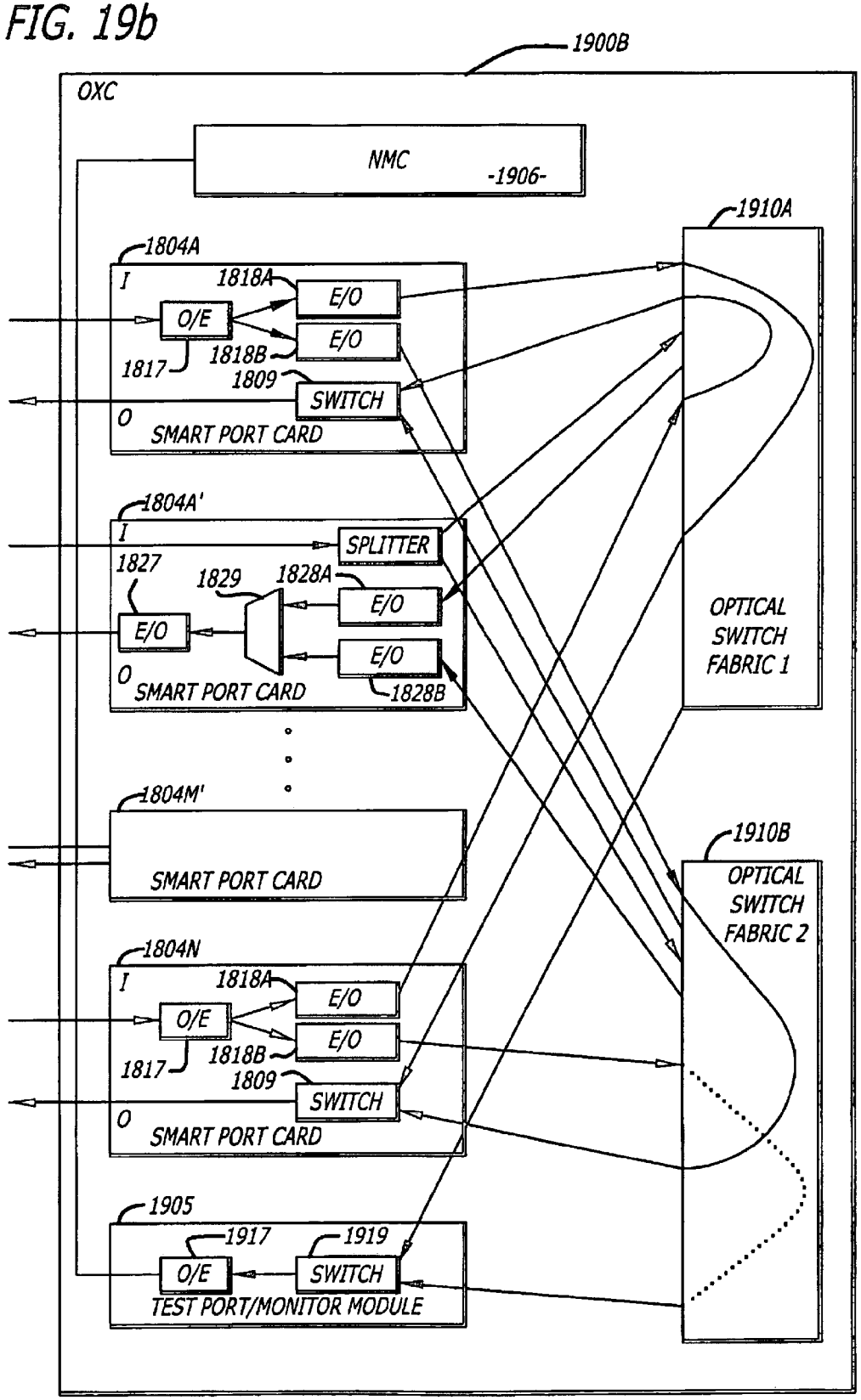

Referring now to FIG. 19B, the optical cross-connect switch 1900B includes smart port cards 1804A–1804N, smart port cards 1804A'–1804M', test port/monitor card 1905, network management controller (NMC) 1906, first optical switch fabric 1910A, and second optical switch fabric 1910B. The elements of smart port cards 1804A–1804N and smart port cards 1804A'–1804M' were previously discussed with reference to FIG. 18. The optical cross-connect switch 1900B provides redundancy similar to the optical cross-connect switch 1900A but uses differing port cards having different components.

Figure 19C:
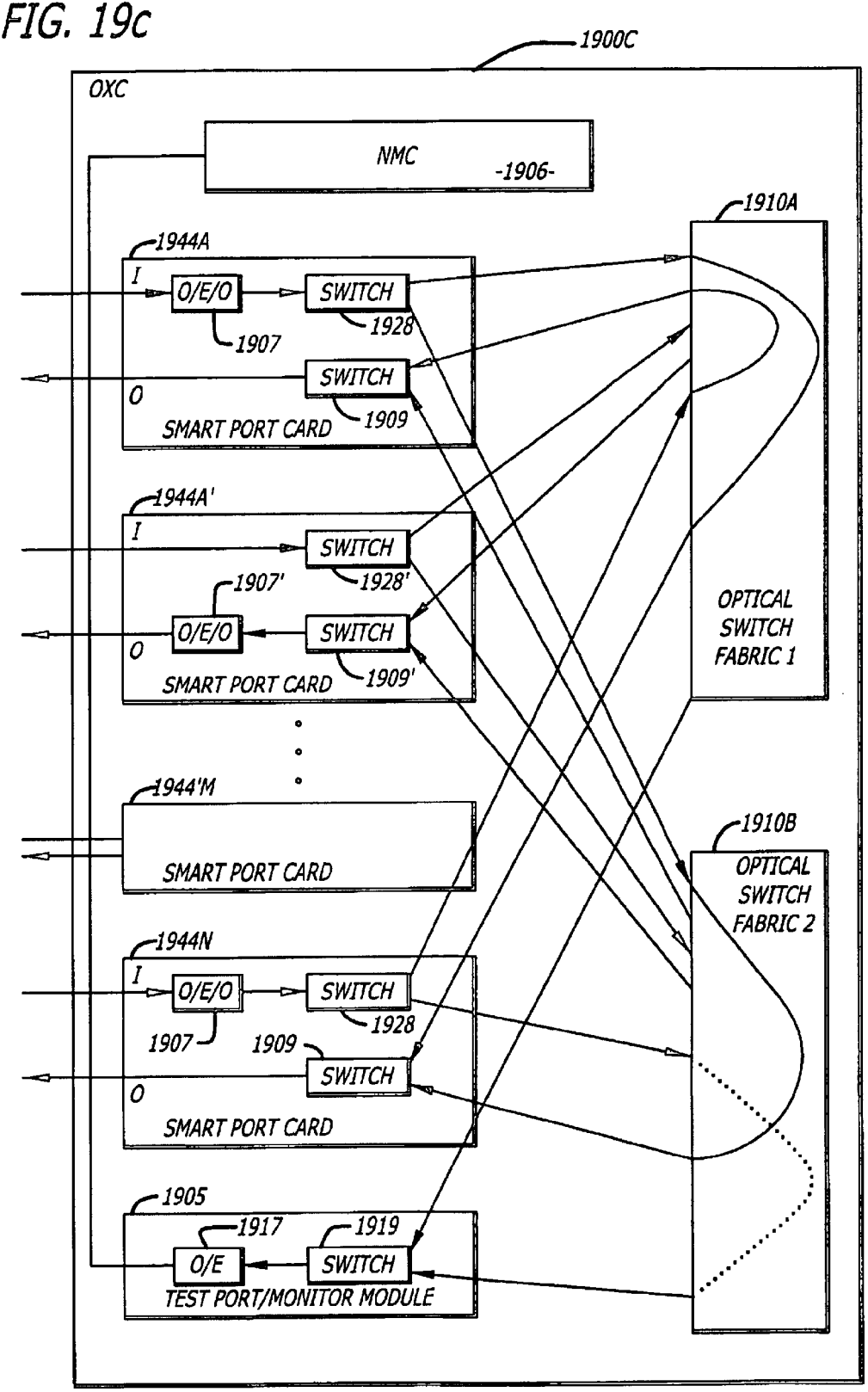

Referring now to FIG. 19C, the optical cross-connect switch 1900C includes smart port cards 1944A–1944N, smart port cards 1944A'–1944M', test port/monitor card 1905, network management controller (NMC) 1906, first optical switch fabric 1910A, and second optical switch fabric 1910B. Smart port cards 1944A–1944N and smart port cards 1944A'–1944M' utilize optical switches 1928 and 1928' as opposed to splitters 1908 and 1908' in smart port cards 1904A–1904N and 1904A–1904M' respectively which were previously described. Optical switches 1928 and 1928' provide less optical power loss than the splitters 1908 and 1908' so that a stronger optical signal can be routed through the optical switch fabric.

Figure 19D:
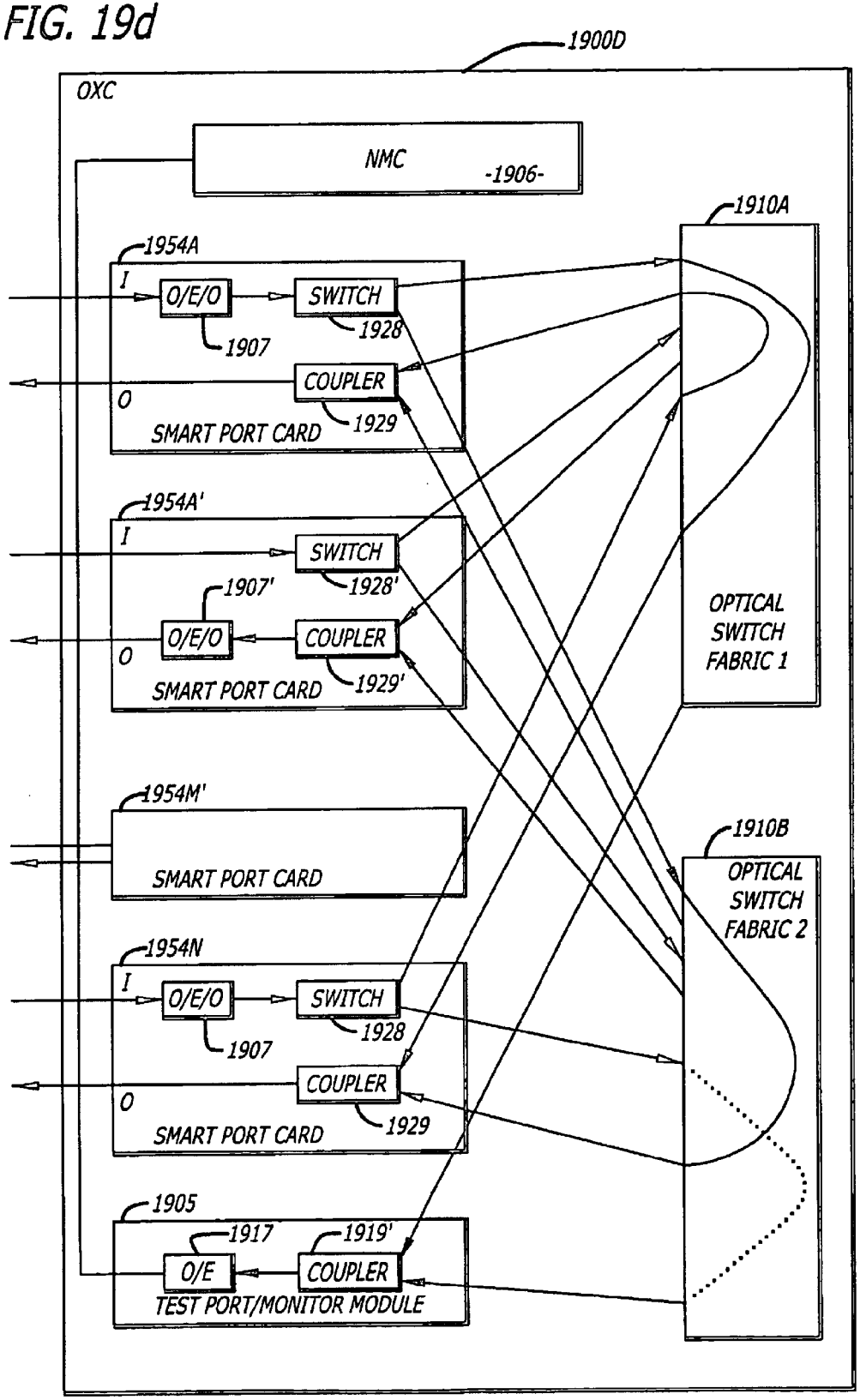

Referring now to FIG. 19D, the optical cross-connect switch 1900D includes smart port cards 1954A–1954N, smart port cards 1954A'–1954M', test port/monitor card 1905, network management controller (NMC) 1906, first optical switch fabric 1910A, and second optical switch fabric 1910B. Smart port cards 1954A–1954N and smart port cards 1954A'–1954M' utilize optical switches 1928 and 1928' and optical couplers 1929 and 1929' as opposed to splitters 1908 and 1908' and optical switches 1909 and 1909' in smart port cards 1904A–1904N and 1904A–1904M' respectively which were previously described. Optical switches 1928 and 1928' provide less optical power loss than the splitters 1908 and 1908'. Optical couplers 1929 and 1929' act similar to a multiplexer and can be passive so that no switching control is required.

Figure 19E:
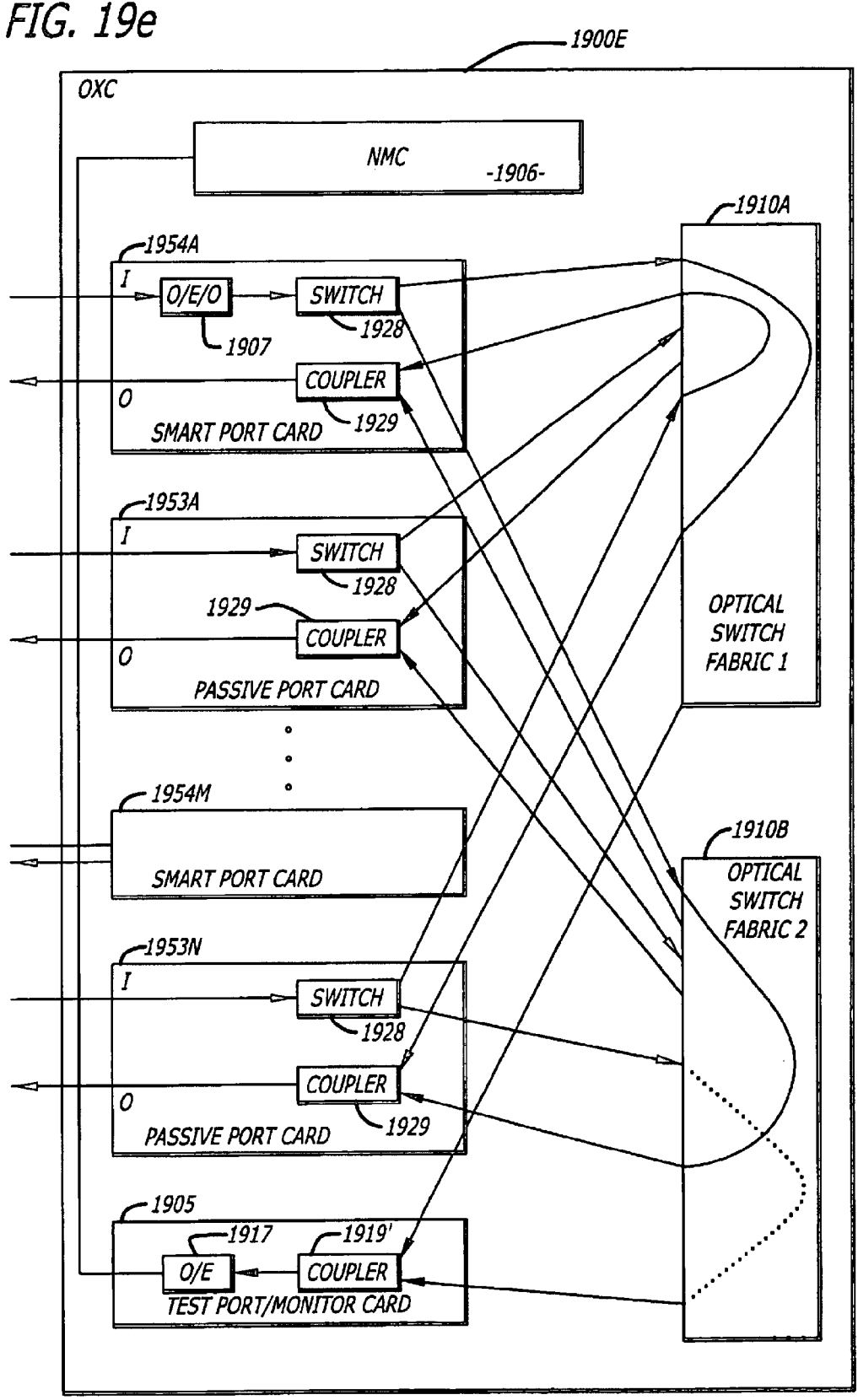

Referring now to FIG. 19E, the optical cross-connect switch 1900E includes smart port cards 1954A–1954M, passive port cards 1953A–1953N, test port/monitor card 1905, network management controller (NMC) 1906, first optical switch fabric 1910A, and second optical switch fabric 1910B. Smart port cards 1954A–1954M utilize optical switches 1928 and optical couplers 1929 as opposed to splitters 1908 and optical switches 1909 in smart port cards 1904A–1904N respectively which were previously described. Each of the passive port cards 1953A–1953N include the optical switch 1928 in the input path and the optical coupler 1929 in the output path as shown. Each of the passive port cards 1953A–1953N do not have an O/E/O in either their input path or their output path. That is, optical cross connect switches providing at least one redundant optical switch fabric can also use passive port cards to reduce the number of O/E/Os and lower costs.

Figure 19F:
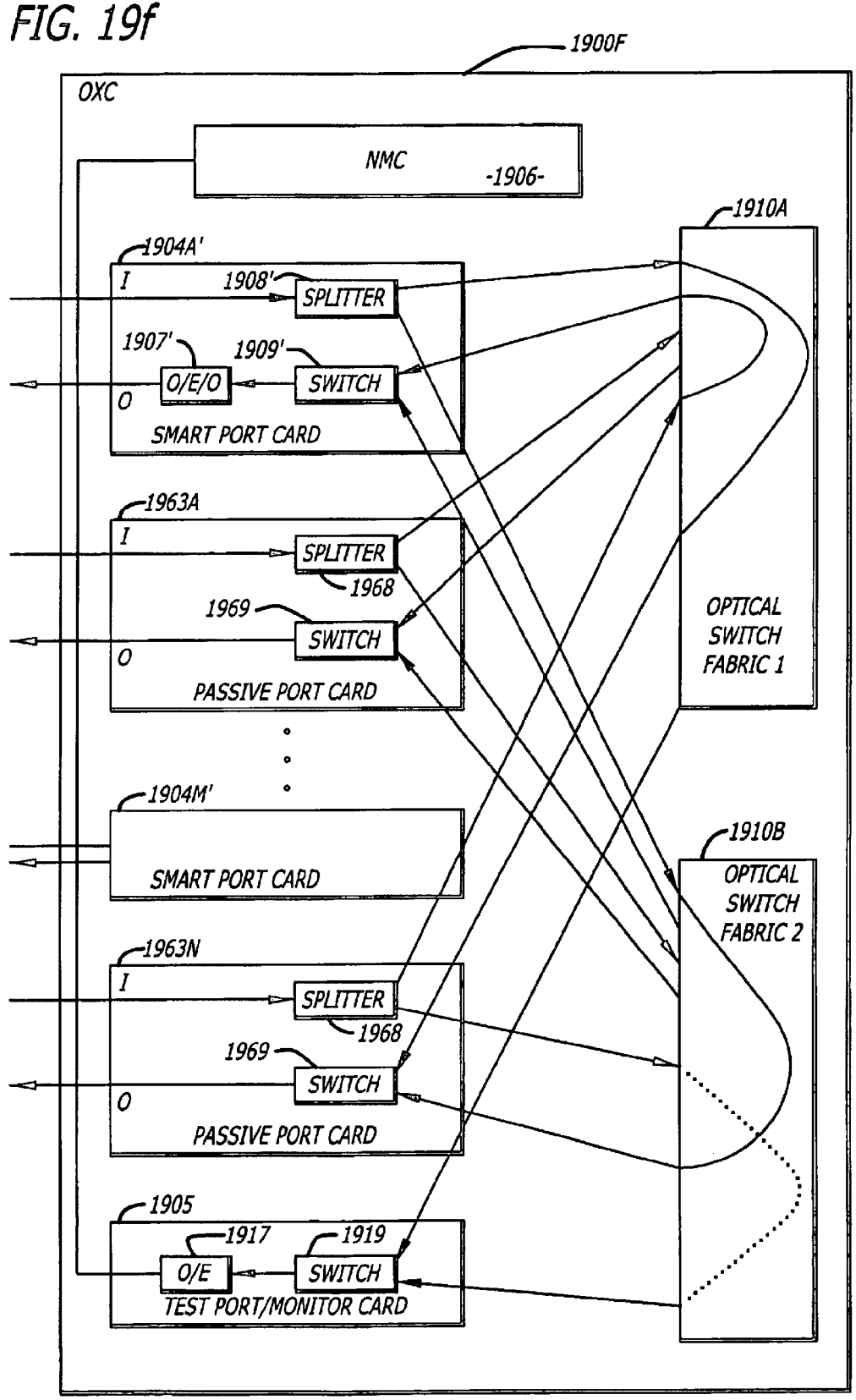

Referring now to FIG. 19F, alternate combinations of passive port cards and smart port cards can be combined within optical cross connect switches having at least one redundant optical switch fabric. In FIG. 19F, the optical cross-connect switch 1900F includes smart port cards 1904A'–1904M', passive port cards 1963A–1963N, test port/monitor card 1905, network management controller (NMC) 1906, first optical switch fabric 1910A, and second optical switch fabric 1910B. Smart port cards 1904A'–1904M' were previously described with respect to FIG. 19A. Each of the passive port cards 1963A–1963N include an optical splitter 1968 in the input path and an optical switch 1969 in the output path as shown. Each of the passive port cards 1963A–1963N do not have an O/E/O in either their input path or their output path.

Figure 19G:
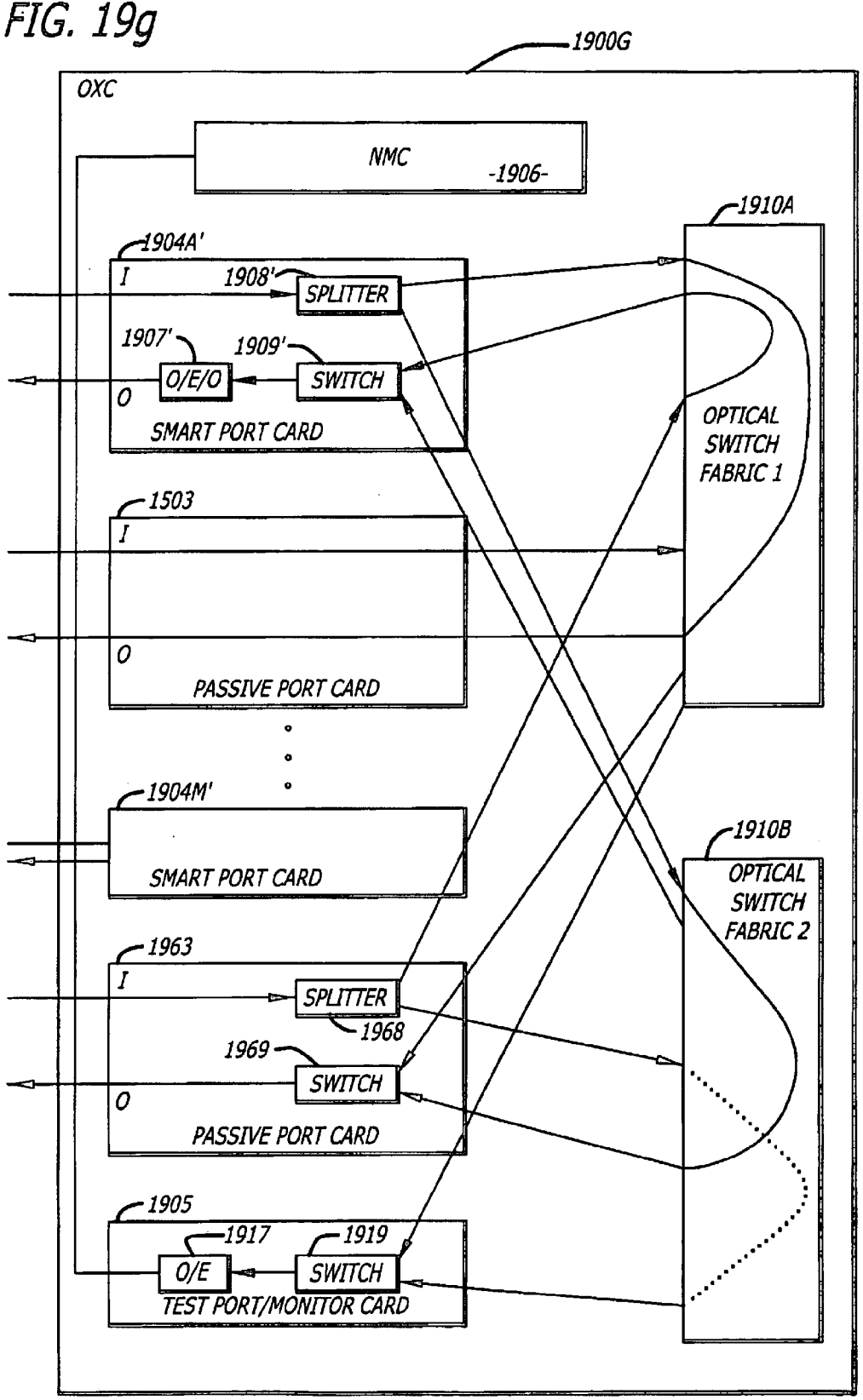

Referring now to FIG. 19G, another embodiment of combinations of passive port cards and smart port cards is illustrated for an optical cross-connect switch having a redundant optical switch fabric. In FIG. 19G, the optical cross-connect switch 1900G includes smart port cards 1904A'–1904M', one or more passive port cards 1963, one or more passive port cards 1503, test port/monitor card 1905, network management controller (NMC) 1906, first optical switch fabric 1910A, and second optical switch fabric 1910B. Smart port cards 1904A'–1904M' were previously described with respect to FIG. 19A. Each of the one or more passive port cards 1963 include an optical splitter 1968 in the input path and an optical switch 1969 in the output path as shown. Each of the one or more passive port cards 1503 provides only a flow through optical path between input and output ports and the optical switch fabrics. Each of the passive port cards 1963 and 1503 do not have an O/E/O in either their input path or their output path.

While its obvious that other combinations of passive port cards, smart port cards, and optical switch fabrics can be formed, it is desirable to provide optical signal regeneration by routing an optical signal over an optical path through the optical cross-connect switch so that at least one optical-electrical-optical conversion occurs to the optical signal to increase the optical power level at the output from what was received at the input. The optical-electrical-optical conversion may used for other reasons as well which were previously described. If it is desirable, a signaling channel previously described between the optical cross connect switch and attached network or client equipment can be used to provide information regarding signal conditions and performance of and around the optical cross-connect switch.

The signaling channel is particularly desirable if nothing but passive port cards without O/E/Os are used in channels of the optical cross-connect switch.

VII. Testing

The optical cross-connect 1900 having redundant optical switch fabrics can readily provide self testability. The optical cross-connect 1900 can optionally include a test port/monitor card 1905 in order to test the optical paths through the first and second optical switch fabrics 1910A and 1910B to perform sophisticated performance monitoring and attach test equipment if needed. One port of either optical switch fabric can be dedicated as a test access port. A test port/monitor card is inserted into the dedicated test access port. The test port/monitor card 1905 monitors one of the split signals to determine if there is a failure in the optical path or not as well as to determine performance measures for the optical signal including a bit error rate (BER). Any incoming optical signal passing through the optical cross-connect 1900 can be accessed and monitored by switching one of the split signals over to the test access port where the test port/monitor card 1905 is present. The other part of the split signal continues to be routed through the optical cross-connect 1900 unaffected. The test access port and test port/monitor card 1905 allow non-intrusive monitoring of the incoming optical signals.

Figure 20:
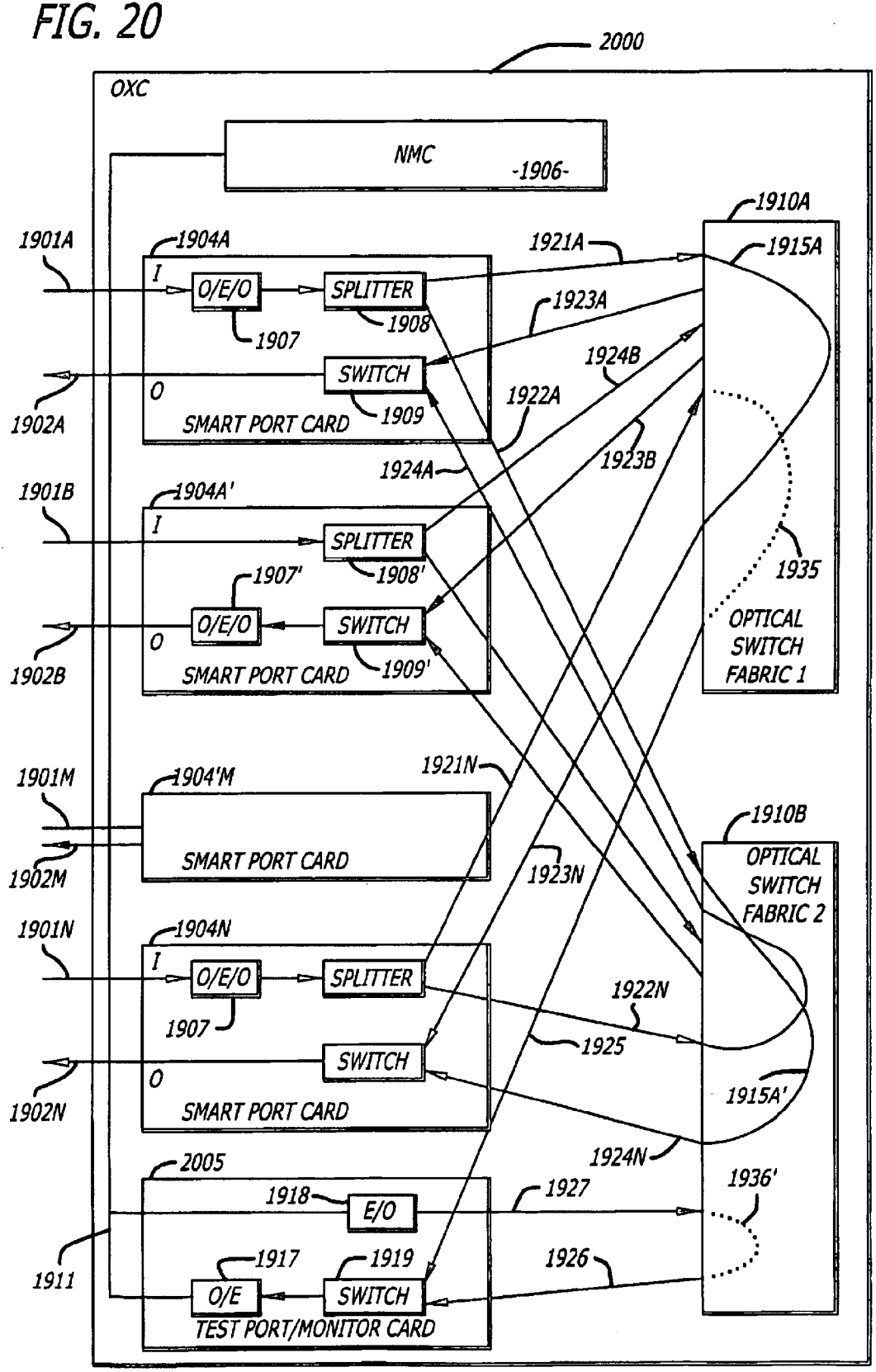
FIG. 20 is a block diagram of an optical cross-connect switch including a test port/monitoring card to provide self-testing/monitoring of the optical switch fabrics of an optical cross-connect switch having redundant optical switch fabrics.

The test port/monitor card 1905 includes an optical switch 1919 and an optical to electrical converter (O/E) 1917. The O/E 1917 couples to a controller within the optical cross-connect 1900 such as the NMC 1906 to process the electrical signals from the test port/monitor card 1905 representing the optical signal of the tested optical path. The optical switch 1917 selects between monitoring an optical path of the first optical switch fabric 1910A and an optical path of the second optical switch fabric 1910B. The optical switch fabric which is being monitored can be referred to as the redundant optical switch fabric, while the optical switch fabric that is being used to carry data over the communication channel connection is referred to as the active optical switch fabric. In FIG. 19A, the second optical switch fabric 1910B is being monitored. The test port selects a port to monitor to determine if an optical signal is actually present on the split optical paths and if so, if the optical path carrying the data in the first optical switch fabric is reliable or has failed. The signals can also be monitored to determine what is the bit error rate through the optical cross-connect switch 1900. The test port card 1905 steps from path to path to sample the signals on the paths to determine where a failure may occur. The test port card can use an algorithm such as a round robin algorithm to test each path in sequence. If a faulty path is detected, the test port card raises an alarm and the information is sent to a network management system, for further fault isolation and servicing of the failure. The test port 1905 can also ping-pong from one optical switch fabric to another in order to alternate the testing process. In FIG. 19A, the second optical switch fabric 1910B is being monitored by the optical path 1926 using a first test input port. Referring momentarily to FIG. 20, the first optical switch fabric 1910A is being monitored by the optical path 1925 using a second test input port as opposed to the second optical switch fabric 1910B to illustrate the ping-pong between optical switch fabrics. Either of the test port cards 1905 and 2005 can step from path to path to sample the signals over the optical paths to determine where a failure may occur. If a faulty optical path is detected, an alarm is signaled and it is removed from available paths in the respective optical switch fabric until its repaired or the redundant optical switch fabric is selected to replace the failing path.

Referring now to FIGS. 19A and 20, the test port/monitor card 1905 illustrated in FIG. 19A monitors incoming optical signals for either optical switch fabric. The test port/monitor card 2005 illustrated in FIG. 20 can monitor incoming optical signals from either optical switch fabric as well as generate its own optical test signal to actively self-test optical paths through the either optical switch fabric. In addition to the O/E 1917 and the optical switch 1919, the test port/monitor card 2005 includes an electrical to optical converter (E/O) 1918 (i.e. a semiconductor laser) to generate an optical test signal which is controlled to actively test optical paths through the first and second optical switch fabrics. The test port/monitor cards 1905 and 2005 can be used in any configuration of an optical cross-connect switch including the single and dual optical switch fabric embodiments disclosed herein.

The present invention is thus described and as one of ordinary skill can see, it has many advantages over the prior art. One advantage of the present invention is that the costs of regenerating signals within an optical cross-connect switch can be reduced by utilizing one O/E/O in the input path or output path of a smart port card of the present invention. Another advantage of the present invention is that non-intrusive monitoring can be performed on the incoming optical signals using the present invention. Still another advantage of the present invention is that self-testing of an optical cross-connect switch can be performed.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, the present invention has been described in detail using an optical cross-connect switch. However, the present invention may be implemented into other optical network equipment that accept optical data signals including an optical bridge, an optical router, an optical hub, an optical node, an optical concentrator, or other networking equipment accepting a data signal embodied in an optical signal. Additionally, it is possible to implement the present invention or some of its features in hardware, firmware, software or a combination thereof where the software is provided in a processor readable storage medium such as a magnetic, optical, or semiconductor storage medium.

What is claimed is:

1. Data signal propagation in an optical network equipment for increased reliability, comprising:

a first data signal embodied in a first optical signal on a first optical path in the optical network equipment;

the first data signal simultaneously embodied in a second optical signal on a second optical path in the optical network equipment;

wherein the first optical path is different from the second optical path;

wherein if the first optical path should fail then the second optical signal on the second optical path can provide continued first data signal propagation in the optical network equipment, or if the second optical path should fail then the first optical signal on the first optical path can provide continued first data signal propagation in the optical network equipment.

2. The data signal propagation of claim 1 further comprising:

the first data signal simultaneously embodied in a third optical signal on a third optical path in the optical network equipment;

wherein the third optical path differs from the first and second optical paths; and wherein if the first and second optical paths should then the third optical signal on the third optical path can provide continued first data signal propagation in the optical network equipment.

3. The data signal propagation of claim 1 further comprising:

a second data signal embodied in a fourth optical signal on a fourth optical path in the optical network equipment, the second data signal differing from the first data signal;

the second data signal simultaneously embodied in a fifth optical signal on a fifth optical path in the optical network equipment;

wherein the fourth optical path differs from the fifth optical path; and wherein if the fourth optical path should fail then the fifth optical signal on the fifth optical path can provide continued second data signal propagation in the optical network equipment, or if the fifth optical path should fail then the fourth optical signal on the fourth optical path can provide continued second data signal propagation in the optical network equipment.

4. The data signal propagation of claim 1 wherein the optical network equipment is an optical bridge, an optical router, an optical cross-connect switch, an optical hub, an optical node, an optical concentrator, or other networking equipment accepting a data signal embodied in an optical signal.

5. A method of increasing reliability in optical network equipment, the method comprising:

converting an input optical signal in the optical domain into an electrical signal in the electrical domain;

concurrently converting the electrical signal in the electrical domain into a first optical signal and a second optical signal in the optical domain;

routing the first optical signal and the second optical signal respectively over two differing optical paths in the optical network equipment;

similarly processing the first optical signal and the second optical signal through the optical network equipment to generate a first processed optical signal and a second processed optical signal respectively; and selecting the stronger signal of either the first processed optical signal or the second processed optical signal as the output optical signal of the optical network equipment.

6. The method of claim 5 wherein the electrical signal in the electrical domain is simultaneously converted into the first optical signal and the second optical signal in the optical domain by an electrical to optical converter and an optical splitter.

7. The method of claim 5 wherein the optical network equipment is an optical cross-connect switch.

8. The method of claim 5 wherein the selecting selects the first processed optical signal as the output optical signal because the second processed optical signal has a weaker signal strength than the first processed optical signal.

9. The method of claim 5 wherein the selecting selects the first processed optical signal as the output optical signal because the second processed optical signal is unavailable for selection by the selecting as a result of a failure in an optical path and the processing of the second optical signal failing to generate the second processed optical signal.

10. The method of claim 9 wherein the second processed optical signal is unavailable for selection by the selecting as a result of a failed component in the optical path over which the second optical signal is routed in the optical network equipment.

11. The method of claim 5 wherein the selecting of either the first processed optical signal or the second processed optical signal includes converting the first processed optical signal in the optical domain into a first processed electrical signal in the electrical domain, converting the second processed optical signal in the optical domain into a second processed electrical signal in the electrical domain, selecting either the first processed electrical signal or the second processed electrical signal as an output electrical signal, and converting the output electrical signal in the electrical domain into the output optical signal in the optical domain.

12. The data signal propagation of claim 1, wherein if the first optical path fails, or the second optical path fails, or both the first and second optical paths fail, an alarm signal embodied in an electrical signal from the optical network equipment to signal a failure of an optical path.

13. The data signal propagation of claim 12 wherein if the first optical path should fail, the alarm signal embodied in the electrical signal from the optical network equipment signals a failure of the first optical path.

14. The data signal propagation of claim 12 further comprising:

the first data signal simultaneously embodied in a third optical signal on a third optical signal path in the optical network equipment;

wherein the third optical path differs from the first and second optical paths; and wherein if both the first and second optical paths should fail, the alarm signal embodied in the electrical signal from the optical network equipment signals a failure of both the first and second optical paths, and the third optical signal on the third optical path can provide continued first data signal propagation in the optical network equipment.

15. The data signal propagation of claim 14 further comprising:

the first data signal simultaneously embodied in a fourth optical signal on a fourth optical signal path in the optical network equipment;

wherein the fourth optical path differs from the first, second and third optical paths; and if the first, second and third optical paths should fail, the alarm signal embodied in the electrical signal from the optical network equipment signals a failure of the first, second and third optical paths, and the fourth optical signal on the fourth optical path can provide continued first data signal propagation in the optical network equipment.

16. The data signal propagation of claim 1 wherein
the optical network equipment is an optical bridge, an optical router, an optical cross-connect switch, an optical hub, an optical node, an optical concentrator, or other networking equipment accepting a data signal embodied in an optical signal.

17. The data signal propagation of claim 1 wherein
a portion of the first optical path is in a first optical switch fabric of the optical network equipment, and
a portion of the second optical path is in a second optical switch fabric of the optical network equipment.

18. A method of data signal propagation in an optical network equipment for increased reliability, the method comprising:
simultaneously embodying a plurality of data signals respectively into a first plurality of optical signals and a second plurality of optical signals, each data signal of the plurality of data signals being different;
respectively propagating the first plurality of optical signals over a first plurality of optical paths in the optical network equipment;
respectively propagating the second plurality of optical signals over a second plurality of optical paths in the optical network equipment, the second plurality of optical paths differing from the first plurality of optical paths;
wherein if one of the optical paths in the first plurality of optical paths should fail then one of the second plurality of optical signals on a respective one of the second plurality of optical paths can provide continued data signal propagation in the optical network equipment, and if one of the optical paths in the second plurality of optical paths should fail then one of the first plurality of optical signals on a respective one of the first plurality of optical paths can provide continued data signal propagation in the optical network equipment.

19. The method of claim 18, wherein
a portion of the first plurality of optical paths are in a first optical switch fabric of the optical network equipment, and
a portion of the second plurality of optical paths are in a second optical switch fabric of the optical network equipment.

20. The method of claim 18, wherein
the optical network equipment is an optical bridge, an optical router, an optical cross-connect switch, an optical hub, an optical node, an optical concentrator, or other networking equipment accepting a data signal embodied in an optical signal.

21. The method of claim 18, further comprising:
if any optical path fails in the first plurality of optical paths, signaling a failure of an optical path in the first plurality of optical paths by transmitting an alarm signal embodied in an electrical signal out from the optical network equipment;
if any optical path fails in the second plurality of optical paths, signaling a failure of an optical path in the second plurality of optical paths by transmitting an alarm signal embodied in an electrical signal out from the optical network equipment; and
if optical paths fail in both the first and second plurality of optical paths, signaling a failure of the optical paths in both the first plurality of optical paths and the second plurality of optical paths by transmitting an alarm signal embodied in an electrical signal out from the optical network equipment.

22. The method of claim 18, further comprising:
if one of the optical paths in the first plurality of optical paths fails, selecting the respective optical signal of the second plurality of optical signals on the respective one of the second plurality of optical paths as an output optical signal for the respective data signal to provide continued data signal propagation in the optical network equipment; and
if one of the optical paths in the second plurality of optical paths fails, selecting the respective optical signal of the first plurality of optical signals on the respective one of the first plurality of optical paths as the output optical signal for the respective data signal to provide continued data signal propagation in the optical network equipment.

* * * * *